(12) United States Patent
Ludban

(10) Patent No.: US 10,940,588 B2
(45) Date of Patent: Mar. 9, 2021

(54) HYBRID DELTA ROBOT

(71) Applicant: Neil Ludban, Columbus, OH (US)

(72) Inventor: Neil Ludban, Columbus, OH (US)

( * ) Notice: Subject to any disclaimer, the term of this patent is extended or adjusted under 35 U.S.C. 154(b) by 333 days.

(21) Appl. No.: 16/131,016

(22) Filed: Sep. 13, 2018

(65) Prior Publication Data

US 2019/0118378 A1 Apr. 25, 2019

Related U.S. Application Data

(60) Provisional application No. 62/576,151, filed on Oct. 24, 2017.

(51) Int. Cl.
| | |
|---|---|
| B25J 9/16 | (2006.01) |
| B25J 9/00 | (2006.01) |
| B25J 17/02 | (2006.01) |

(52) U.S. Cl.
CPC ........... *B25J 9/1664* (2013.01); *B25J 9/0009* (2013.01); *B25J 9/0051* (2013.01); *B25J 9/1623* (2013.01); *B25J 17/0241* (2013.01); *B25J 17/0258* (2013.01); *B25J 17/0275* (2013.01); *B25J 17/0283* (2013.01)

(58) Field of Classification Search
CPC ...... B25J 9/1664; B25J 9/0009; B25J 9/0051; B25J 9/1623; B25J 17/0241; B25J 17/0258; B25J 17/0275; B25J 17/0283
See application file for complete search history.

(56) References Cited

U.S. PATENT DOCUMENTS

| | | | |
|---|---|---|---|
| 3,619,911 A | 11/1971 | Pancoe | |
| 5,656,905 A | 8/1997 | Tsai | |
| 7,090,458 B2 | 8/2006 | Guang et al. | |
| 9,032,831 B2* | 5/2015 | Sutherland | B25J 5/00 74/490.05 |
| 9,505,126 B2* | 11/2016 | D'Egidio | B25J 9/1623 |
| 9,566,708 B2* | 2/2017 | Kurnianto | B25J 9/02 |
| 10,507,576 B2* | 12/2019 | Ilch | B25J 9/0051 |
| 10,646,990 B2* | 5/2020 | Olds | A61B 34/35 |
| 2012/0282588 A1 | 11/2012 | Stevens et al. | |
| 2014/0311271 A1 | 10/2014 | Cao et al. | |
| 2016/0114481 A1* | 4/2016 | D'Egidio | B25J 9/1065 414/729 |
| 2020/0262055 A1* | 8/2020 | Angood | B25J 9/0039 |

OTHER PUBLICATIONS

Internet pages at URL Https://en.wikipedia.org/wiki/Delta_robot#Design.

* cited by examiner

*Primary Examiner* — Nicholas Kiswanto

(74) *Attorney, Agent, or Firm* — Eric G. Halsne

(57) ABSTRACT

The invention relates to an improved robotic arm apparatus and associated method which improves a robot configured in a "delta" arrangement. The robotic arm apparatus is arranged with three substantially identical movable arm assemblies connected together with three linear actuators in a triangular configuration such that each end of each linear actuator has at least one translational degree of freedom.

20 Claims, 16 Drawing Sheets

Fig. 3
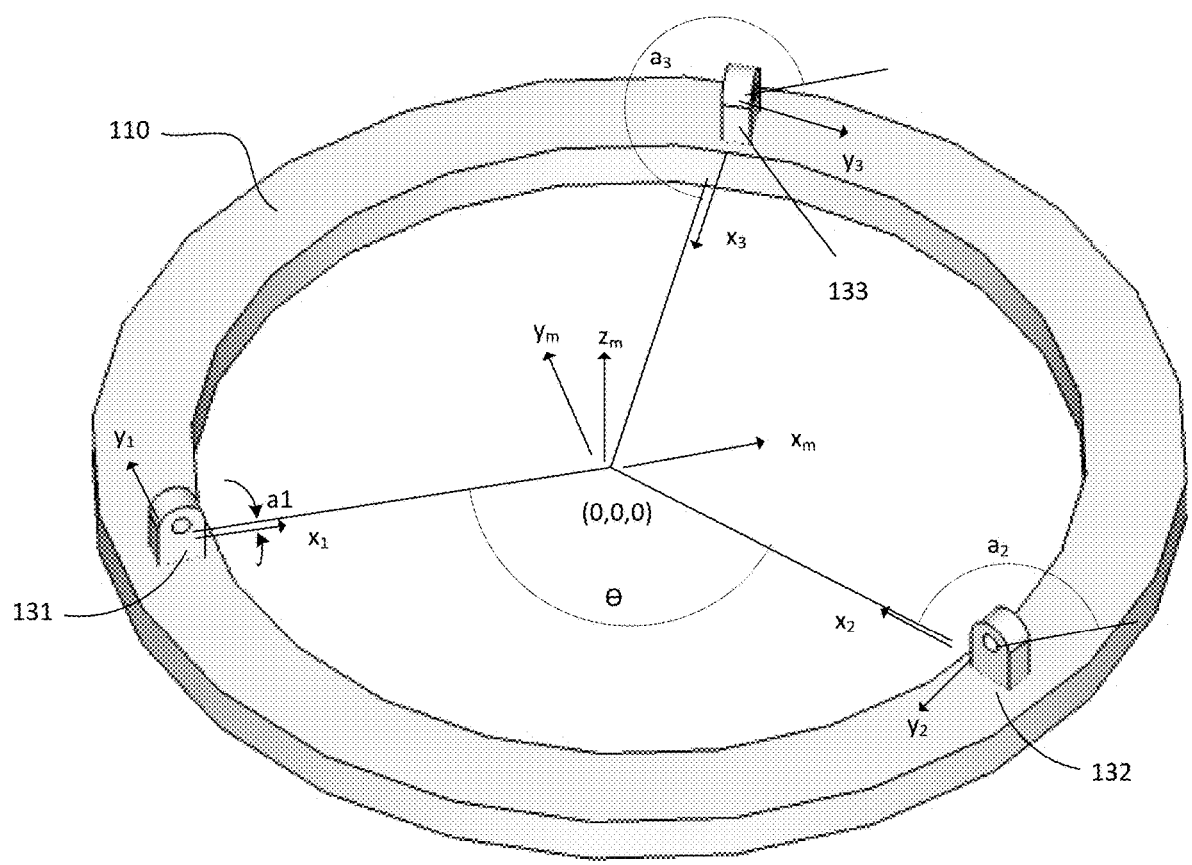
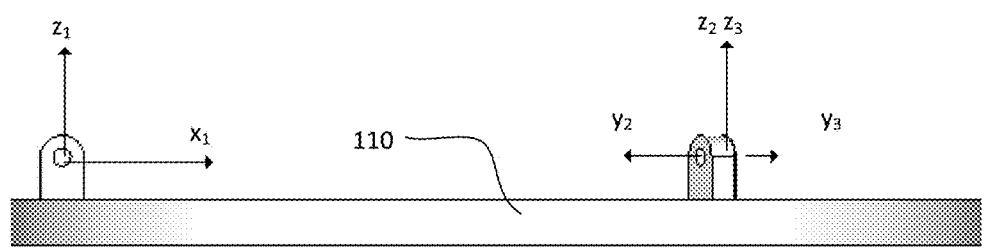

HYBRID DELTA ROBOT

BACKGROUND OF THE INVENTION

The invention relates to an improved robotic arm apparatus and associated method which improves a robot configured in a "delta" arrangement.

"Delta" type robots are well known in the art. A key geometrical concept of the delta robot lies in the use of parallelograms which can be arranged to restrict the movement of the end platform to pure translation, i.e. platform movement in the X, Y or Z direction with no rotation. The prior art delta robot's base is mounted above the workspace, wherein all of the actuators are located on the base. Three jointed arms are disposed within the middle bounds of the base and extend from the base. The jointed arm ends are connected to a small triangular platform. From this arrangement, actuation of the input links at the base side of the arms moves the triangular platform along the X, Y or Z direction.

Actuation with delta robots may be done with either linear or rotational actuators. The actuators may be configured with or without reduction, such as with direct drive motors. Designers of prior art delta robots may be led to locate all of the actuators in the base so that the arms can be made of a light composite material. Consequently, the moving parts of the delta robot may have a small inertia. And small inertia allows for a higher speed and higher accelerations of the arms. Although having all of the arms connected together to the end-effector increases the robot stiffness, the arrangement may restrict and reduce its working volume and range of motion. Further description of delta robot design may be viewed at Https://en.wikipedia.org/wiki/Delta_robot#Design.

FIG. 1 illustrates a typical prior art delta robot 10 having three linear actuators slidably disposed upon a fixed based arranged above a movable end platform. The linear actuators are positioned around the middle joint of the fixed base along prismatic ways to affect the platform arranged at the ends of the lower arm pairs. Delta robots such as this prior art device may be optimal for operations having light loads and needing high speeds, such as pick and place operations.

The improved hybrid delta robot described here may be better than prior art delta designs, in particular in working conditions needing moderate loads and speeds, such as 3D printing, laser cutter, light milling. In these applications, the weight and inertia associated with having motors integrated with the actuators is acceptable. But there are several disadvantages of such prior art delta robots. As can be seen in FIG. 1, the base arrangement restricts placement of the end platform to on one side of the base, which may make it expensive to support the base further above the work volume in order to obtain the desired range of motion. Alignment of linear ways in the prior art arm for accurate operation may be complex, which limits the ability to quickly disassemble and move the device. And the prismatic linear ways required by the previous design are quite expensive and can be cost prohibitive for larger robots. Precision rotary actuators are also generally expensive.

Thus what is needed is a better delta configuration robot which avoids the problems presented by the prior art.

SUMMARY OF THE INVENTION

In accordance with the principles of the present invention, an improved robotic arm device apparatus is described which consists of a "delta" type arm structure having a novel and inventive modification. The improved and hybrid delta robot design consists of several parts in a novel and useful arrangement. A fixed base supports three bellcrank arms. Each bellcrank arm is rotatably connected to a respective lower arm pair, which may or may not be similar to present art delta robot designs. An end platform is attached to each of the lower arms, the end platform also perhaps being similar to present delta robot designs.

Three linear actuators drive the robot. The actuators are arranged in a unique triangular disposition with each actuator end connected to the non-base ends of two bellcrank arms. Controllers and power amplifiers supply motive force and control of the actuator motors.

The control of the improved delta robot is preferably by computerized electronic control software and/or firmware in the form of hardware computer processors executing software instructions. The computer controls associated power and motor control circuitry to drive the set of linear actuators to positions that place the end platform in the desired position.

Compared to standard delta designs, the improved apparatus has similar lower arm pairs and end platform geometries. But the base of the improved delta robot can be optionally disposed at mid-height above the lower arms and work area. And the prior art linear actuators may be mixed with rotary joints instead of expensive prismatic ways.

Advantages of the inventive hybrid robot are several and obvious by the description here. The inventive hybrid delta robot attains lower cost by using linear actuators instead of expensive rotary actuators, and at the same time having acceptable speed, accuracy, and no backlash. Rotary joints are used instead of expensive prismatic linear ways in the improved design, reducing cost further.

Second, the bulk of the mass and forces in the inventive hybrid delta design lie in a simple triangular base at mid-height, which eliminates the tall, fully enclosing frames of other deltas. Tetrahedral arms, which are inherently lightweight and stiff, may be adopted in this design. And the design is easily scalable. The basic design of the improved delta robot is the same from small enough to fit on a desktop to large enough to 3D print a building.

In comparison to standard delta robots, the hybrid design also has the following distinguishing characteristics:

1. The majority of the forces generated by gravity on the tool and arms act to rotate the arms inwards. For light applications, this characteristic further reduces or eliminates backlash in the actuator.

2. Warping may be minimized with the three point base of the inventive design, which always rests solid compared to typical rectangular bases in prior art designs. Devices operating in the Cartesian coordinate system, e.g. in XYZ coordinates, in general need to be built (or calibrated) so that all three axes are square to each other, and so are often built with parallel ways on each axis. Such prior art machines need to be leveled after installation or they warp under their own weight.

3. Calibration of the inventive design is simpler. Simply probing a circular path over a flat surface should result in orthogonal XYZ motion with the arrangement.

4. Triangular structures can be taken apart and easily reassembled into the exact same shape. This is an advantage for portability where it can be moved through doorways and transported in a car, and for storage because it's not taking up floor space when not in use.

Thus in accordance with the various embodiments of the invention, an improved delta-configured robotic arm apparatus is described comprising a planar base with three rotatable attachment points spaced at equal angular intervals around a common midpoint. Three substantially identical movable arm assemblies, each movable arm assembly rotatably attached to one of the rotatable attachment points, each comprise a rigid bellcrank having a joint end rotatably attached to the respective rotatable attachment point, an actuator end and a lower arm end. Each lower arm includes a joint end rotatably attached to the bellcrank lower arm end and a rotatable platform attachment point end. The apparatus further includes an end effector platform comprising three attachment points, each platform attachment point rotatably attached to a respective lower arm rotatable platform attachment point end. Three substantially identical linear actuators each have two ends. Each linear actuator end is connected between two of the bellcrank actuator ends, such that the three linear actuators are disposed in a triangular arrangement. In a preferred embodiment, each end of each linear actuator has exactly one translational degree of freedom.

The control of the robotic arm apparatus may be by use of a hardware computer system under control of a computer program product executing software instructions for converting a desired end platform position to a set of lengths for the linear actuators, and for generating a corresponding signal to power each linear actuator to the desired length.

Various embodiments of joints between the movable members of the hybrid delta robot are also described. Example joints are universal joints, spherical joints, and offset joints.

According to another embodiment of the invention, a method for controlling the positioning of the above-summarized hybrid delta robot is described. One preferred method includes the steps of providing a delta-configured robotic arm apparatus as described previously, automatically calculating a desired position for the end effector platform, applying power to one or more of the arm apparatus linear actuators based on the automatically calculating step, establishing a desired length of the one or more linear actuators responsive to the applying power step, and positioning the end effector platform in the desired position responsive to the establishing step.

Enablement of the above-described method is preferably via the execution of computer software instructions to transform the desired position in a machine coordinate system to an arm coordinate system. End platform velocity and path may optionally be included in the method.

IN THE DRAWINGS

FIG. 3 illustrates one embodiment of the hybrid delta robot base.

Figure 4A:
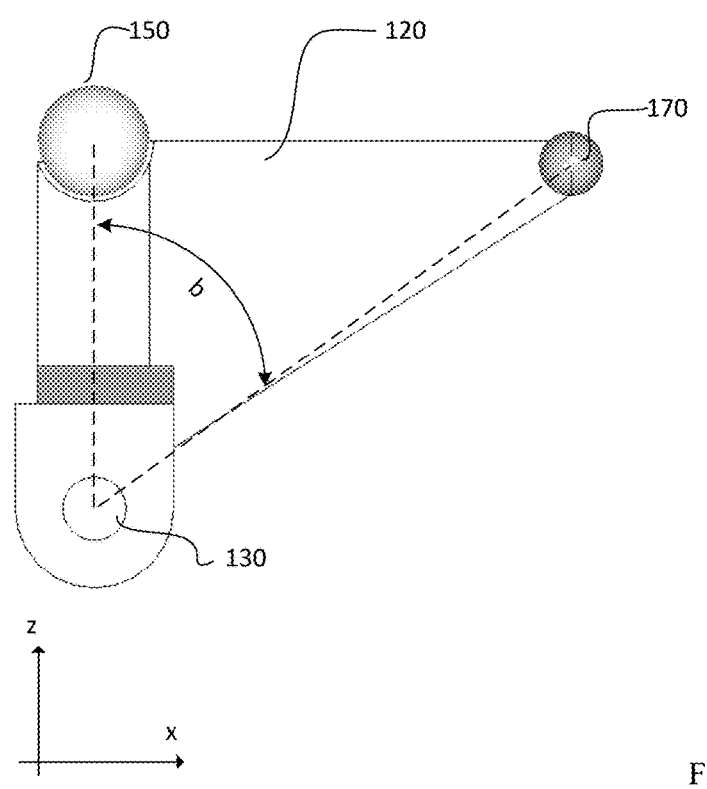
Figure 4B:
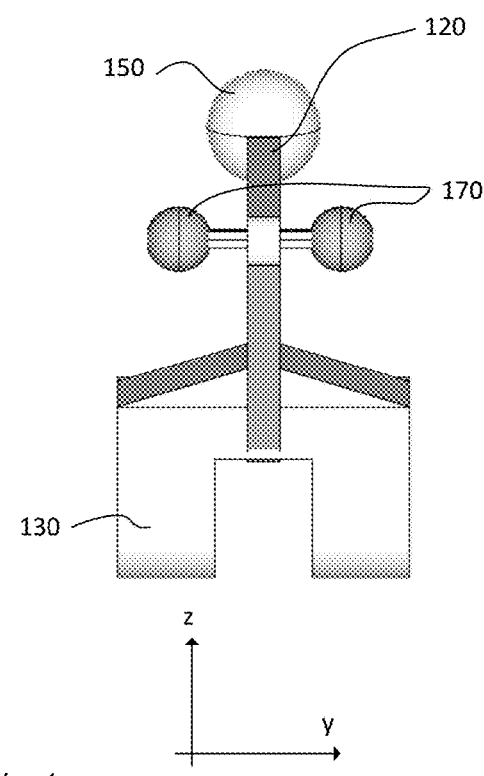
Figure 4C:
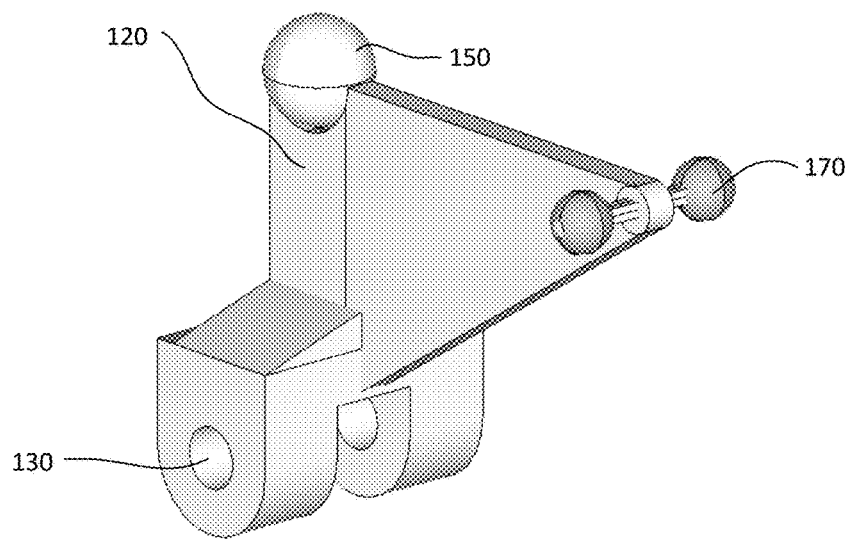

FIG. 4a, FIG. 4b, and FIG. 4c illustrate views of one embodiment of the hybrid delta robot bellcrank arm.

Figure 5:
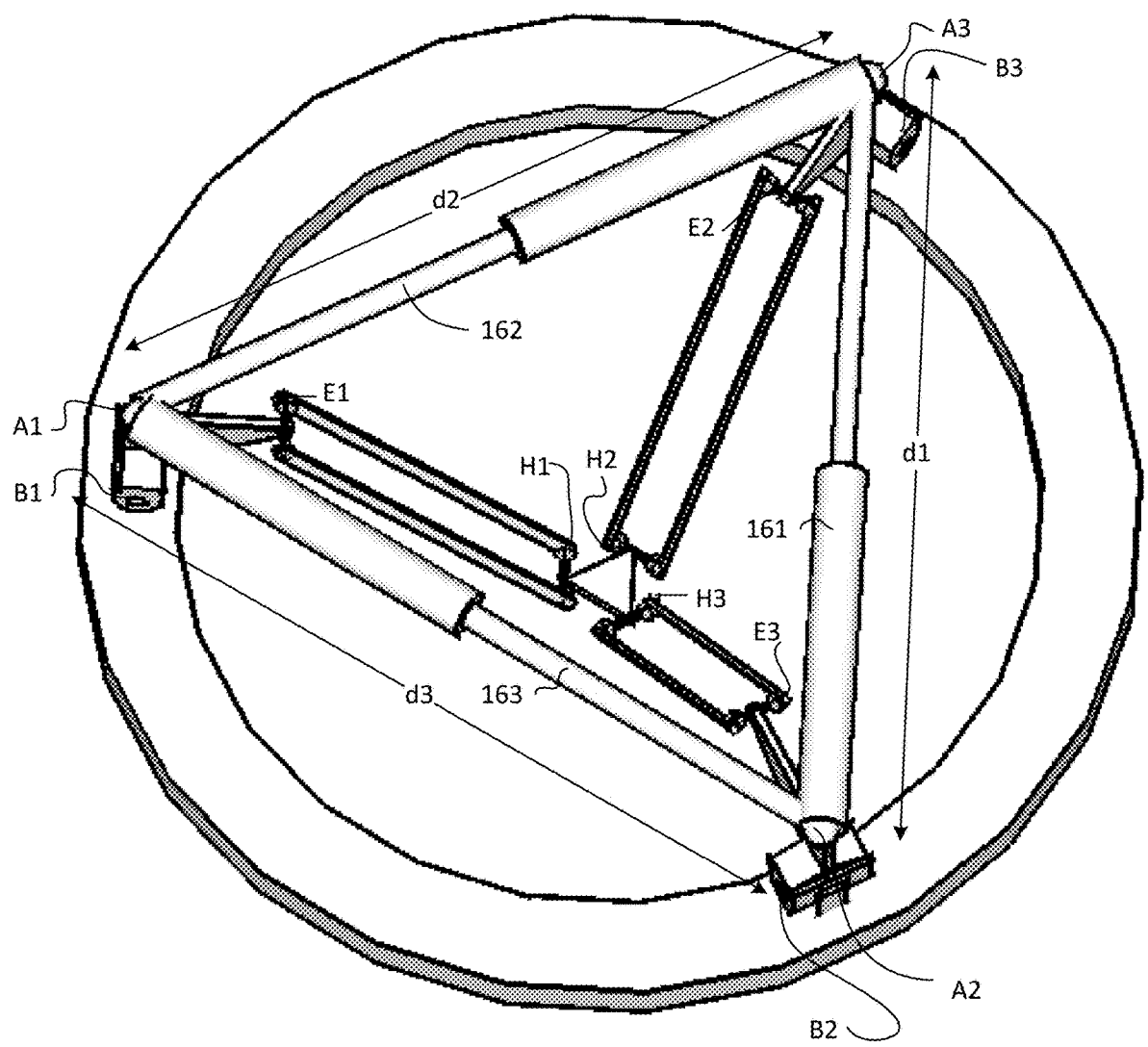

FIG. 5 illustrates one embodiment of the hybrid delta robot actuator arrangement.

Figure 6:
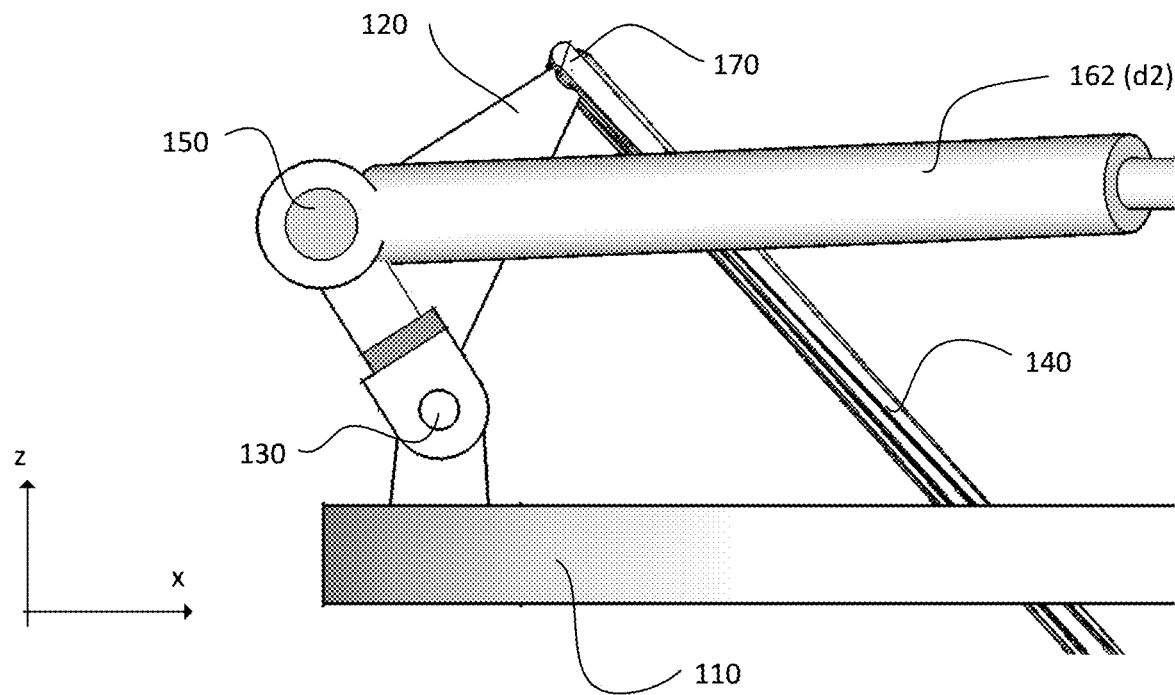

FIG. 6 illustrates one embodiment of the connection arrangement of the moving arms of the hybrid delta robot.

Figure 7A:
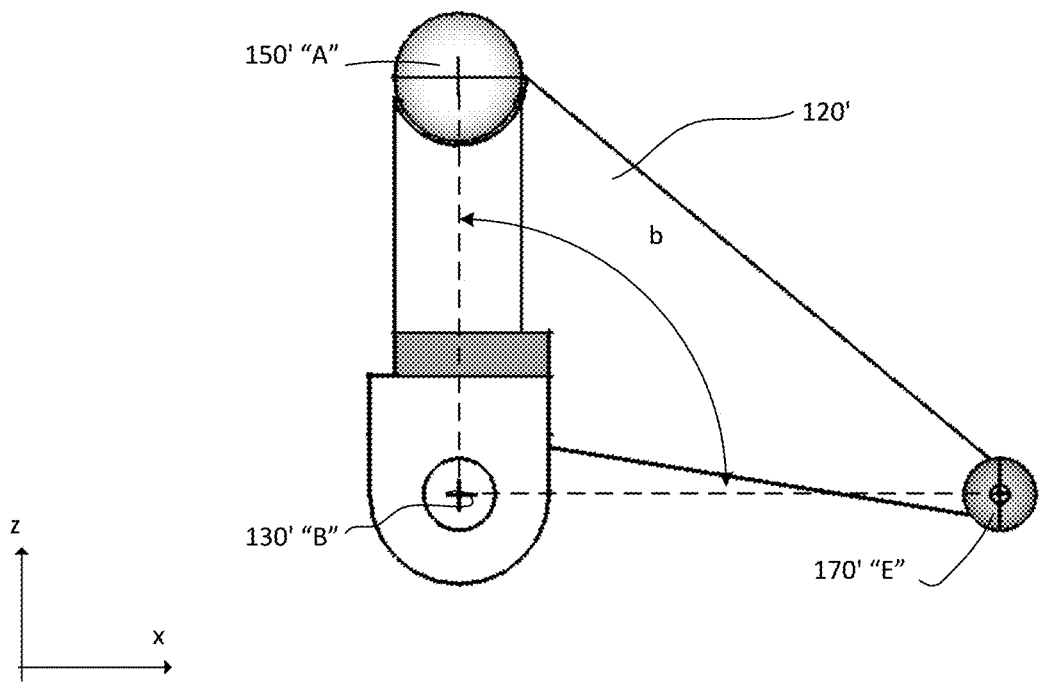
Figure 7B:
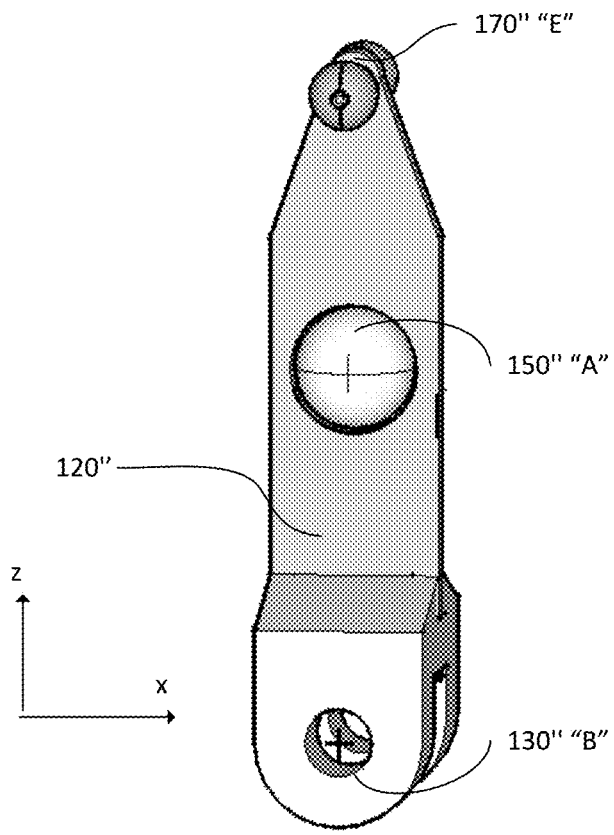
Figure 7C:
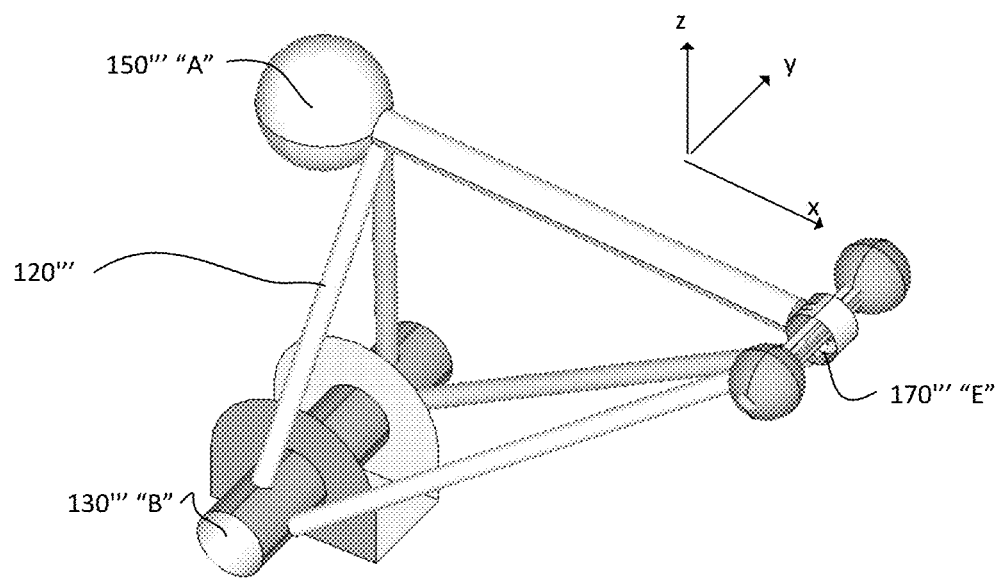

FIG. 7a, FIG. 7b, and FIG. 7c illustrate other embodiments of the hybrid delta robot bellcrank arm.

Figure 8:
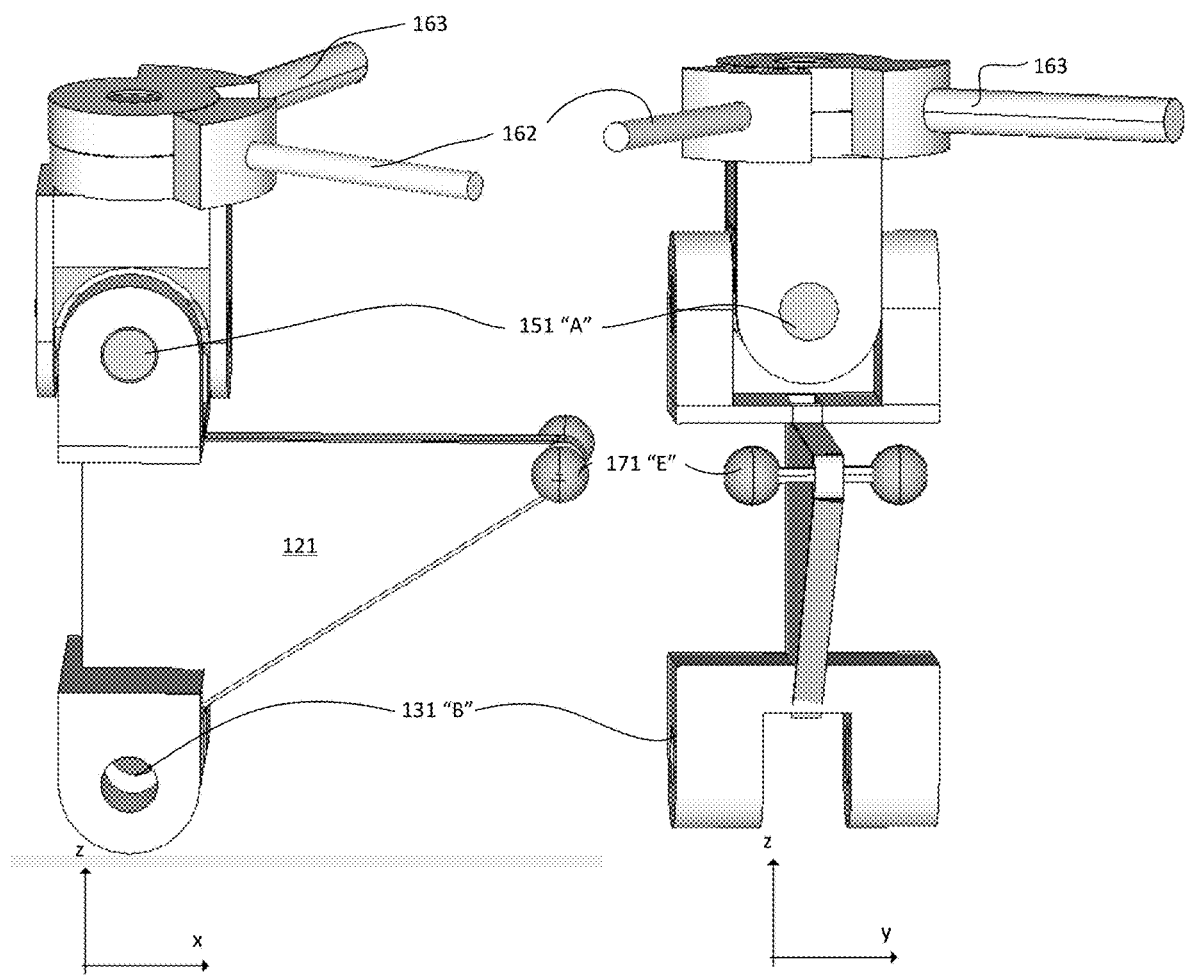

FIG. 8 illustrates one embodiment of the bellcrank arm to actuator rotatable end joint.

Figure 9:
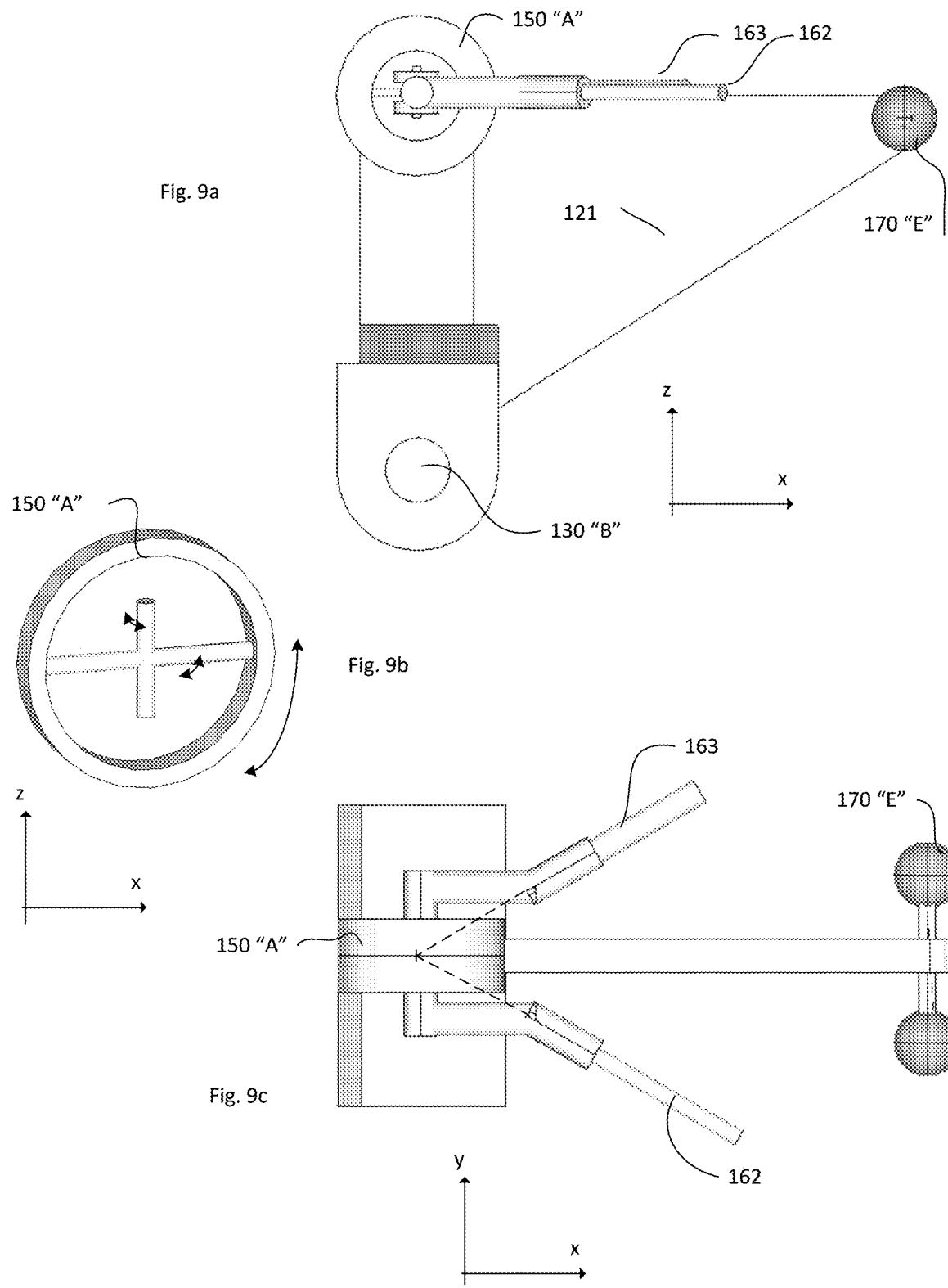

FIG. 9a, FIG. 9b, and FIG. 9c illustrate views of other embodiments of the bellcrank arm to actuator rotatable end joint.

Figure 10:
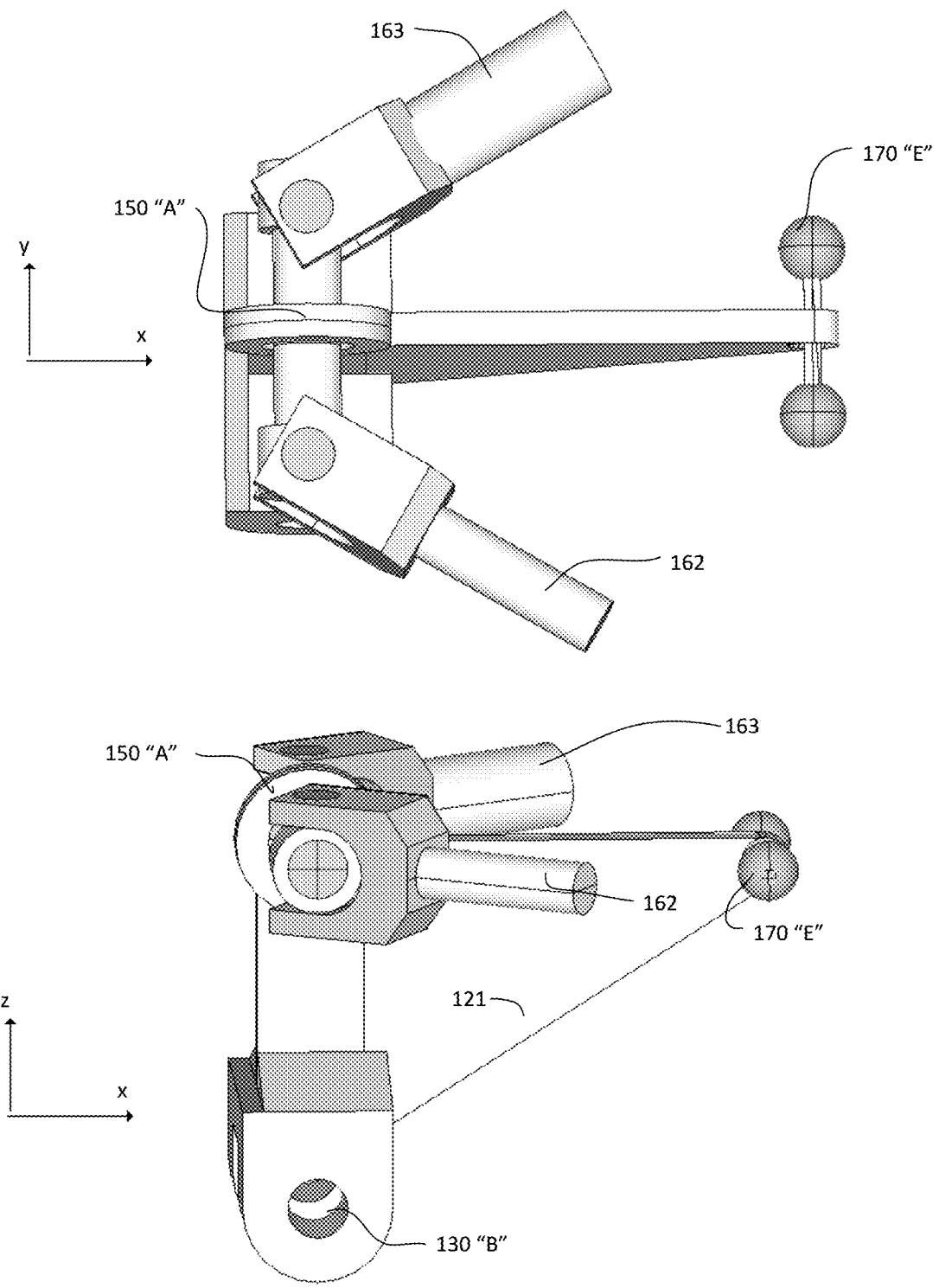

FIG. 10 illustrates yet another embodiment of the bellcrank arm to actuator rotatable end joint.

Figure 11:
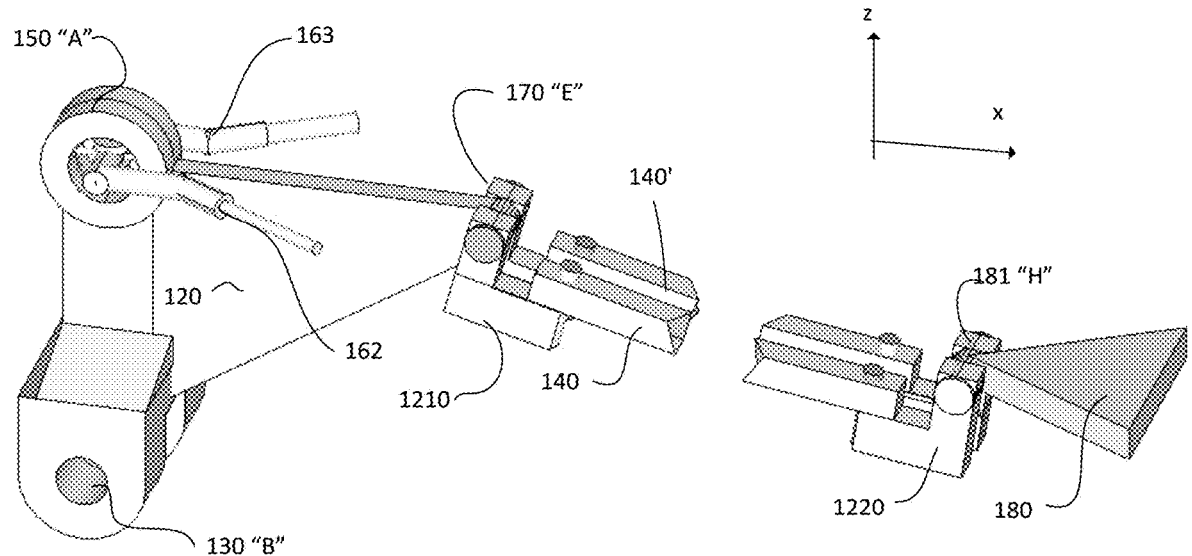

FIG. 11 illustrates an embodiment of the joint assembly between the bellcrank and lower arm and of the lower arm to the end platform, each joint assembly comprising an offset link.

Figure 12:
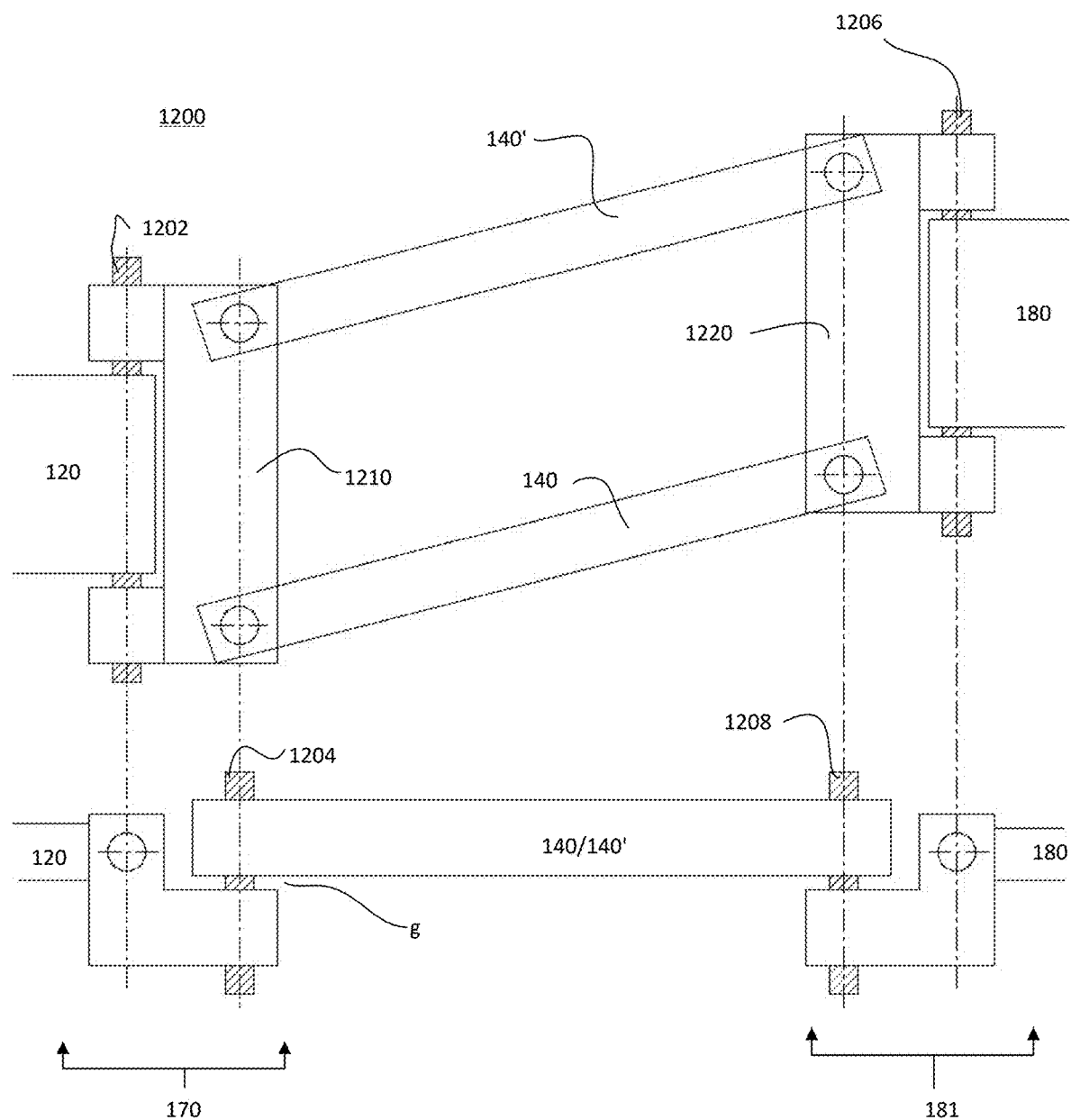

FIG. 12 illustrates a detailed view of an embodiment of the joint assembly having offset links between the bellcrank, lower arm, and end platform.

Figure 13:
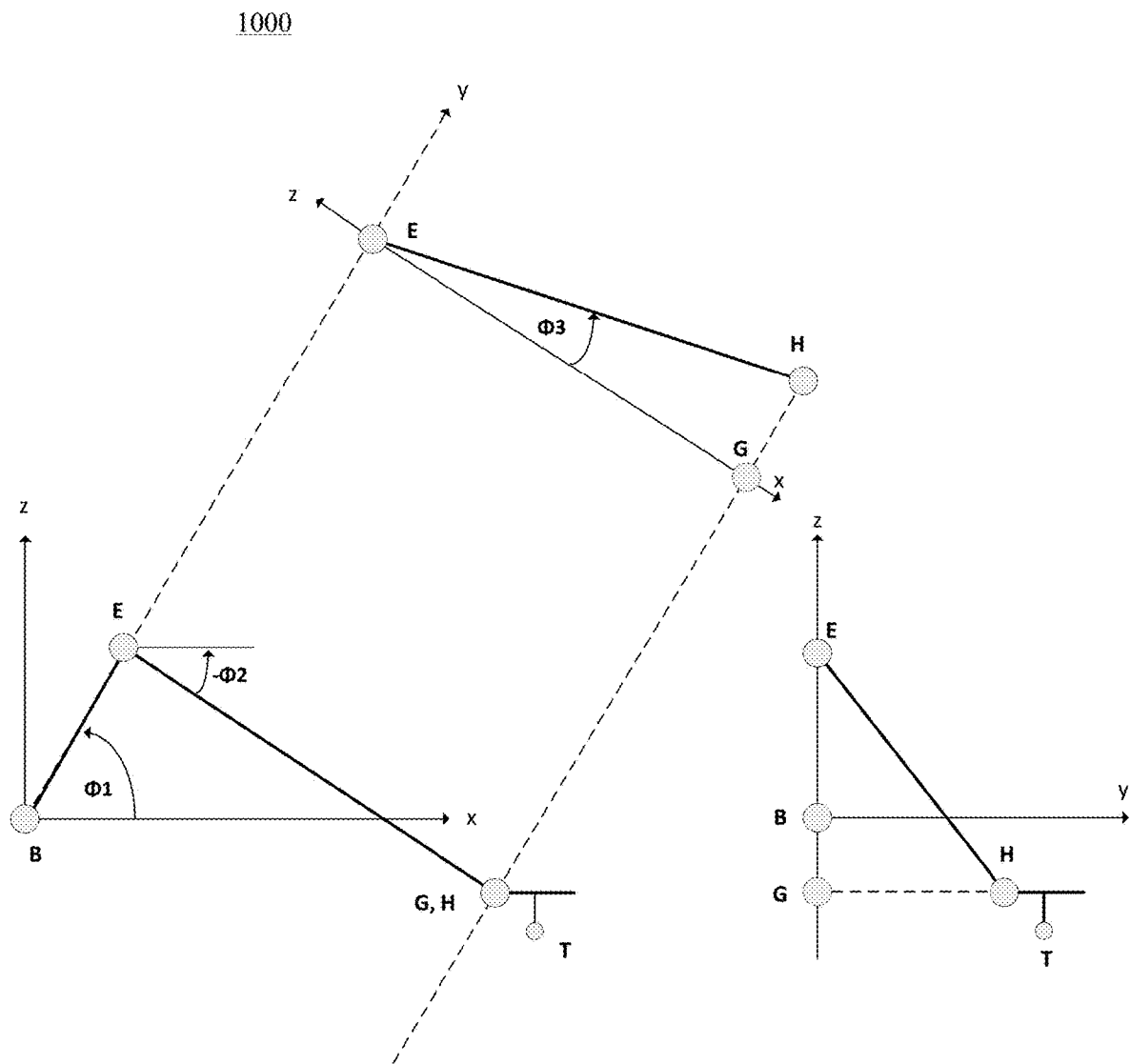

FIG. 13 illustrates a coordinate system diagram for use in understanding the apparatus control system which is without offset links.

Figure 14:
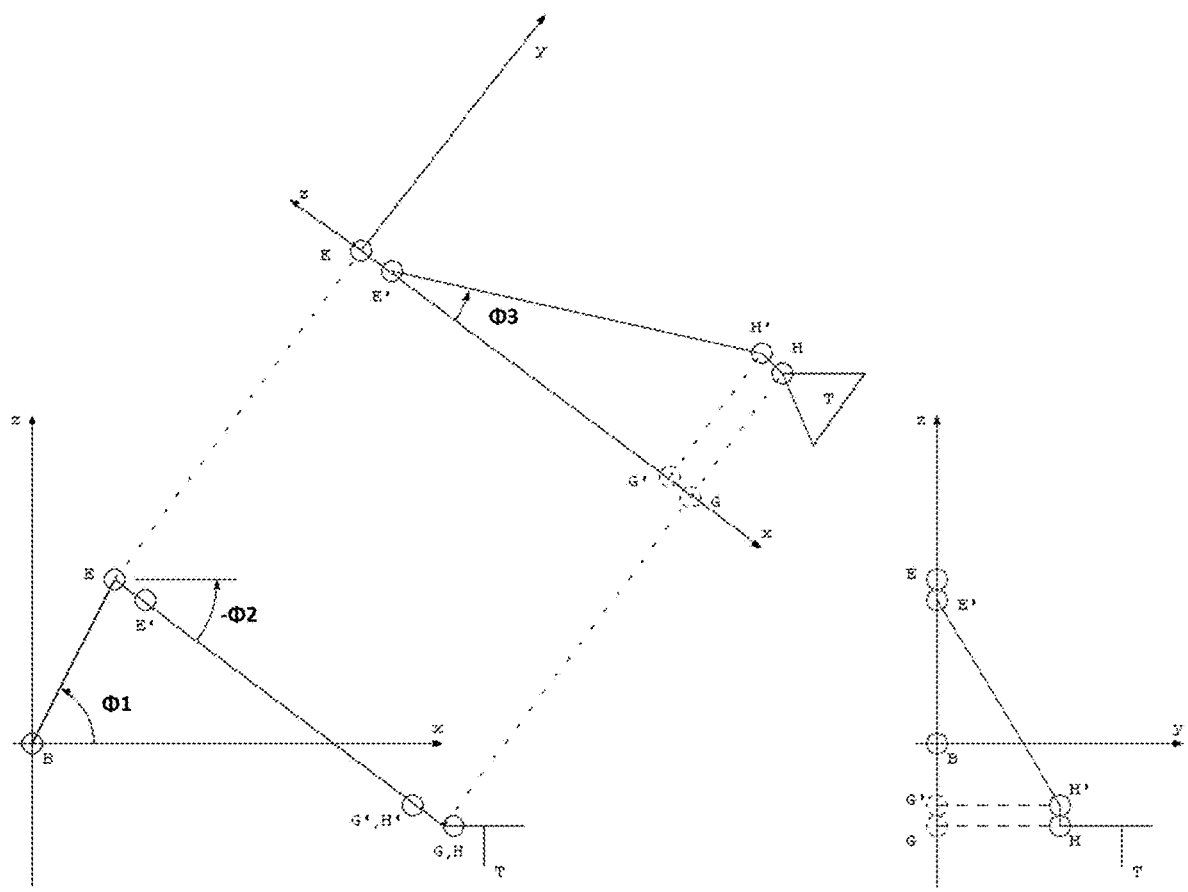

FIG. 14 illustrates an alternate coordinate system diagram for use in understanding the apparatus control system which includes offset links.

Figure 15:
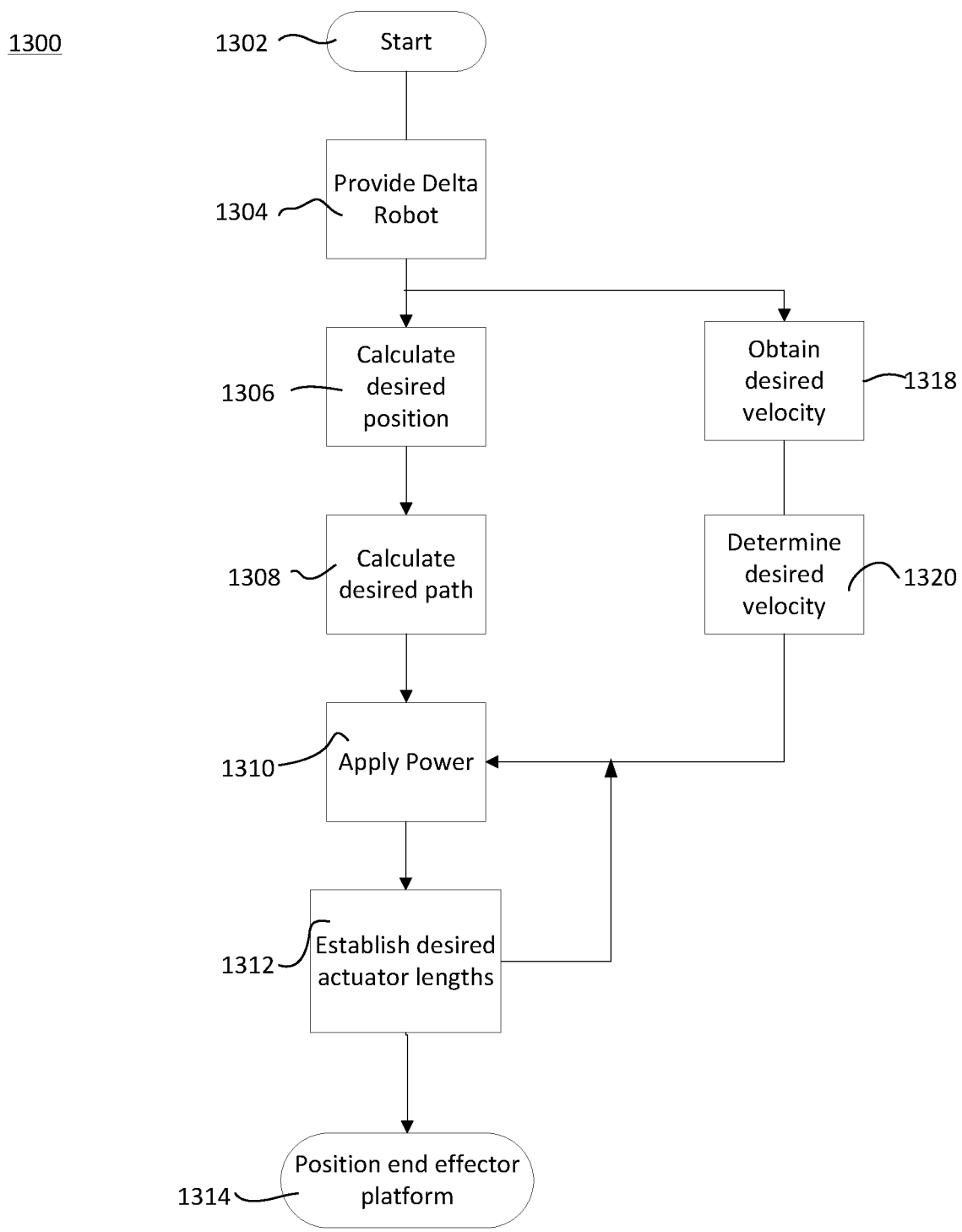

FIG. 15 illustrates a method for using the inventive hybrid delta robot assembly.

Figure 16:
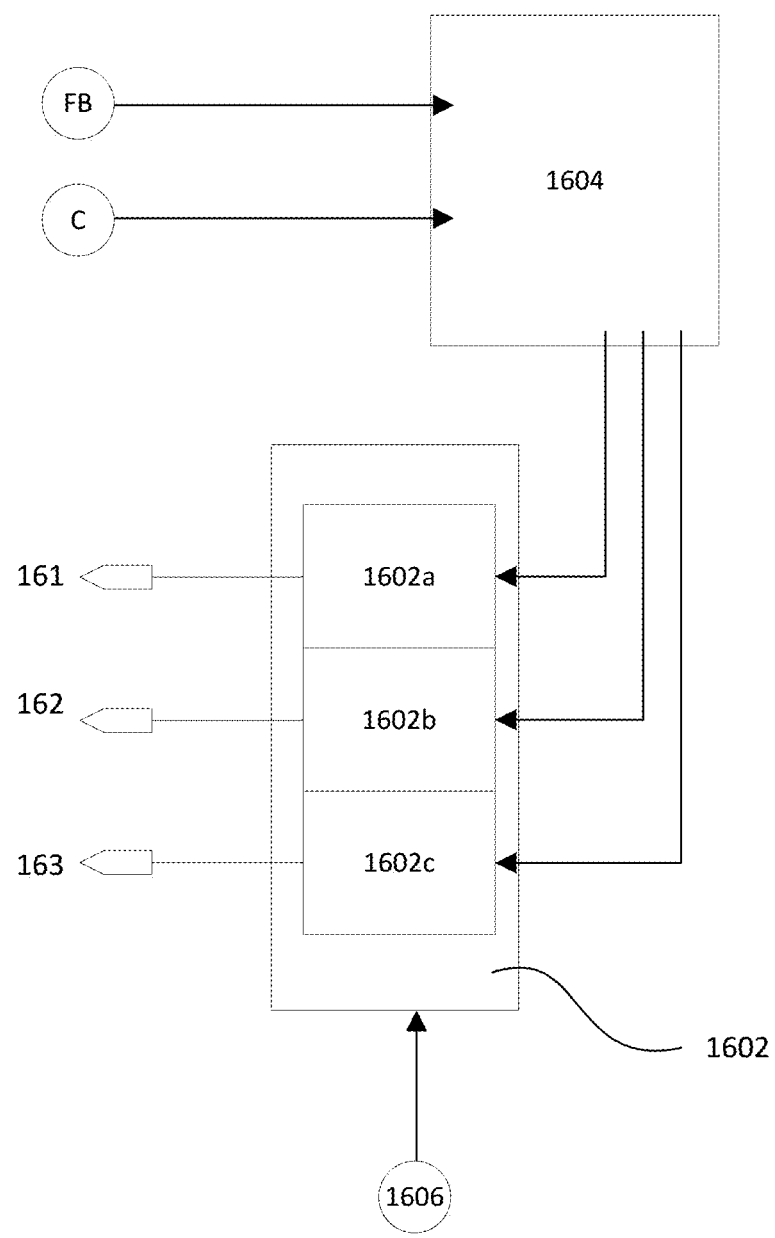

FIG. 16 illustrates an example control system for the inventive hybrid delta robot.

DETAILED DESCRIPTION OF THE EMBODIMENTS

Figure 1:
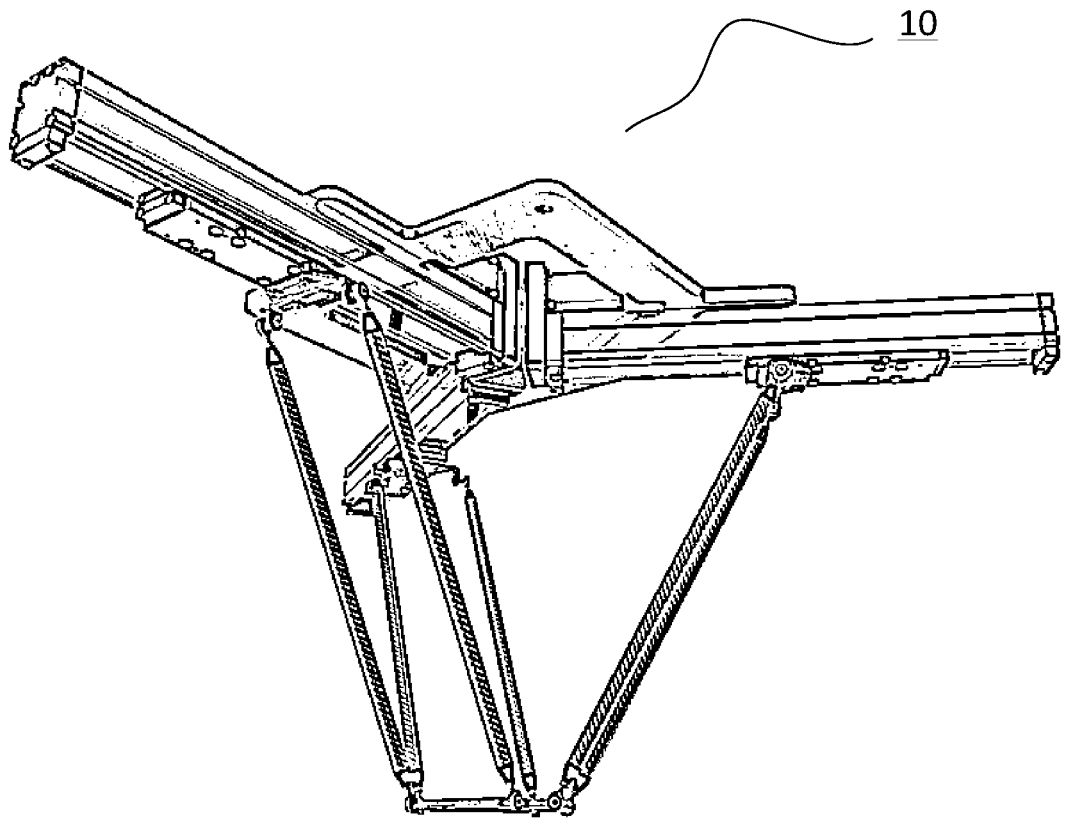
FIG. 1 illustrates a prior art delta-configuration robot.
Figure 2:
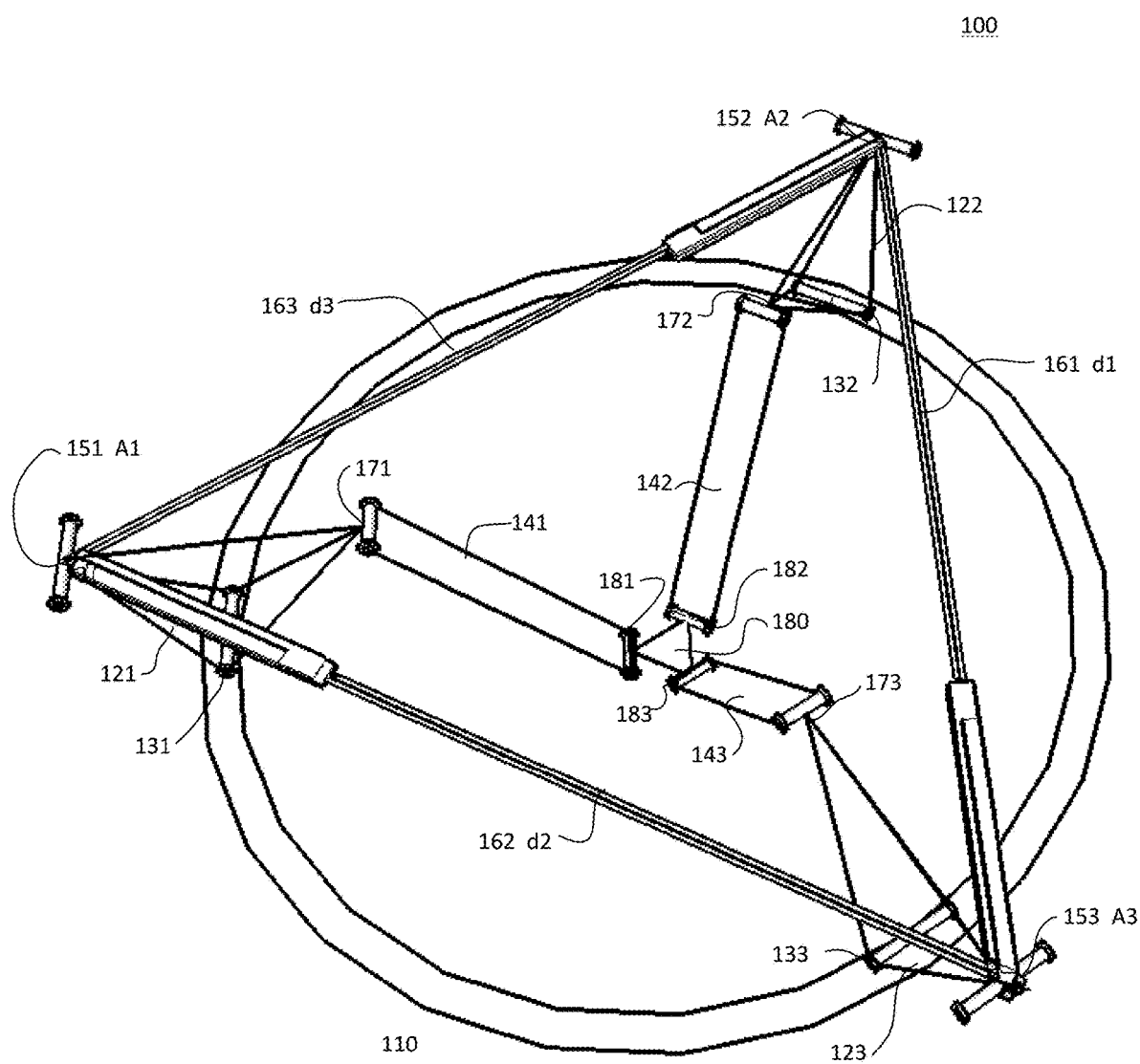
FIG. 2 illustrates one embodiment of the inventive hybrid delta robot, according to the invention.

Now turning to the illustrations, FIG. 2 is a wireframe perspective view of a basic embodiment of the inventive hybrid delta-configured robotic arm apparatus 100. The robot apparatus is comprised of several parts. A fixed planar base 110 provides support for the entire mechanism. Planar base 110 is shown in FIG. 2 as a circle for ease of explanation, but may be arranged in other shapes.

Affixed to base 110 are three attachment points 131, 132, 133, preferably spaced at equal, i.e. 120 degree, intervals around a common interior midpoint such as the base center point as illustrated in FIG. 3. Each attachment point 131, 132, 133 includes a rotatable axis which is generally tangential to the circle defined by the attachment points.

The apparatus includes three substantially identical movable arm assemblies, each rotatably attached to one of the base rotatable attachment points 131, 132, 133. Each arm assembly comprises several elements. Bellcrank arm elements 121, 122, 123 each include a joint end rotatably attached to one of the base attachment points at 131, 132, 133.

Each bellcrank arm element further includes two other attachment points. Bellcrank-to-actuator end joints 151, 152, 153 rotatably connect each bellcrank to two of three linear actuators 161, 162, 163. The arrangement enables the rotating movement of each bellcrank about its base attachment point caused by a change in controlled length of the linear actuators.

The third attachment point for each bellcrank arm element is a bellcrank-to-lower arm joint 171, 172, 173, also indicated generically as joint 170. Each bellcrank-to-lower arm joint 171, 172, 173 is disposed to rotatably attach to a lower arm 141, 142, 143. As in prior art delta robots, each lower arm is disposed as an inner arm pair that forms a parallel linkage. The combined action of the three inner arm pairs restricts the end platform 180 to translational movement only with no rotation. Each lower arm 141, 142, 143 also comprises a joint 181, 182, 183 for connecting to end effector platform 180. Joint 181, 182, 183 may be similar to joint 171, 172, 173.

End platform 180 comprises the end effector for the robot on which tooling, pick devices, coating spray heads, etc. may be mounted. Platform 180 may include prior art features that allow for attachment of such tooling, the attachments not shown. End platform 180 is rotatably attached to each lower arm attachment point such that the platform preferably translates throughout the operating volume during operation, but does not rotate.

The length of each of linear actuators 161, 162, 163 are also referred to later and in FIG. 2 as lengths d1, d2, and d3. Each actuator is substantially identical to each other, and may be selected from currently known linear actuators. One end of each linear actuator is connected to one of the bellcrank actuator ends, and the other end of the actuator is connected to another of the bellcrank actuator ends. The linear actuators 161 (d1), 162 (d2), and 163 (d3) are thus arranged to appear in a triangular disposition regardless of the respective controlled lengths of the actuators.

FIG. 16 shows an example arrangement 1600 for controllers and power amplifiers for the actuator motors. The arrangement is disposed to position the hybrid delta robot end platform by positioning each of linear actuators d1, d2, and d3 to desired lengths, the combination of which correspond to a desired end platform position. Each combination of desired lengths of d1, d2, d3 for a desired end platform position may be calculated through a geometric transform that is established by a computer hardware controller 1604 under control of a computer program product. The computer program product executes software instructions for converting an input of the desired end effector platform position, for example "C" shown in FIG. 16, to a length of each linear actuator.

Controller 1604 sends control signals to the power source 1602, which independently drives each of the linear actuators 161, 162, 163 to a desired length. The independently controlled power supplies 1602a, 1602b, 1602c are shown in FIG. 16 as disposed within the main power source, but it is understood that the power supplies may reside on the linear actuators themselves.

Power source 1602 may be battery powered. Of course, power source 1602 may also be powered from an external power source 1606.

The computer controller 1604 is preferably a hardware computer processor and associated circuitry that controllably applies power to each of the linear actuators to position the end platform at the desired position. Electronic control software and/or firmware are preferably in the form of hardware computer processors executing software instructions, along with associated power and control circuitry. Feedback control algorithms taking input from a position sensor, shown as FB in FIG. 16, may optionally be used to more precisely and positively position the platform.

FIG. 2 also indicates that length d1 is opposite bellcrank-to-actuator end joint 151, which is also indicated for later purposes as A1. Length d2 similarly corresponds to bellcrank-to-actuator end joint 152. Length d3 similarly corresponds to bellcrank-to-actuator end joint 153. Such referencing will become apparent during discussion of the method for controlling the apparatus.

FIGS. 3 through 11 illustrate various and preferred details of the hybrid robot components. FIG. 3 illustrates a top perspective view and a side view of a preferred fixed planar base 110 supporting three attachment points 131, 132, 133, one for each of the three bellcrank arms. The points are ideally located at 120 degree intervals, shown as θ around a circle. The machine's Cartesian ($x_m$, $y_m$, $z_m$) coordinate system has its origin at the mid-point represented by position (0,0,0) between the three attachment points. In this embodiment, the arms to be attached to the attachment points are numbered in a counterclockwise fashion:

i. Attachment point 131 is disposed on the left side on the xm axis.

ii. Attachment point 132 is disposed on the right side below the xm axis.

iii. Attachment point 133 is disposed on the right side above the xm axis.

Planar base 110 is shown as a circle to simplify illustration and explanation. It could alternatively be built in other shapes, such as a triangle or hexagon, without any change in function.

For purposes of illustration in developing the control equations, each arm, for example bellcrank arms 121/122/123, connected to points 131, 132, 133 defines its own local coordinate frame. The subscript "i" refers to the respective angle or axis 1, 2, or 3 at points 131, 132, 133. The reference frames for each location "i" are related to the machine's coordinate system as follows:

The translation in $x_m$ and $y_m$ is relative to the machine origin (0,0, 0).

The rotation (angles $a_i$) about $z_i$ is such that $x_i$ intersects the machine origin.

Each $z_i$ is parallel to $z_m$.

Each $y_i$ completes the right-handed coordinate frame.

Each joint 131, 132, 133 is revolute, allowing one rotational degree of freedom (DOF) about the $y_i$ axis. It can be seen from FIG. 3 that in general, each joint x axis points toward the machine origin, and each joint y axis points tangent to the machine origin in the machine's x-y plane. All z axes are parallel to each other.

Small variations in position or rotation of this arrangement may be measured and compensated for in the control algorithms to be described. This includes variation in the "tilt" rotation about an $x_i$ axis. However, larger variations may restrict the range of motion through interference between moving parts, and may cause singularities in which the arms fall over or require excessive force to move. Variations from the specified arrangement thus should be avoided.

FIGS. 4a, 4b, and 4c illustrate views of one embodiment of a generally triangular shaped bellcrank arm 120 that is configured for angled motion. It is understood that the arm 120 is an example of substantially identical arms 121, 122, 123. Arm 120 is a bellcrank having one rotational DOF about the yi axis at a base-to-bellcrank rotatable attachment point 130 (also see point "B" on the control geometry FIG. 13). It is further understood that the attachment point 130 is disposed to rotatably connect to attachment points 131, 132, or 133 via known means such as a pin.

Arm 120 also includes a bellcrank-to-actuator end joint 150 (also see point "A" on the control geometry FIG. 13), disposed to rotatably attach to two linear actuators. Joint 150 is preferably a three rotational DOF joint for each actuator end.

Arm 120 also includes a bellcrank-to-lower arm joint 170, which rotatably receives the lower arm pairs 141, 142, 143 at a position to each side of arm 120. The position of joint 170 corresponds to point "E" on the control geometry FIG. 13. For the purposes of motion control, joint 170 may be idealized as a single point in the xi-zi plane. Joint 170 is preferably a three rotational DOF joint for each lower arm end.

In the FIG. 4 embodiment, arm 120 is in a neutral position when the line BA (between joint 130 and joint 150) is on the zi axis. The linear actuators to be connected at joint 150 are preferably sized to accommodate arm rotation of approximately 30 degrees either side of the neutral position. Within this limited extent of travel, the arc traversed by point "A" joint 150 loosely approximates a straight line.

The bellcrank 120 angle "b" formed by the joints 130, 150 and 170 (from "AB" to "BE") converts the horizontally actuated joint motion as driven by the linear actuators to a position, direction, and speed suitable for positioning end platform 180. Thus joint 170 (or point "E") travels through an arc with the same angular width as joint 150 "A", and similarly loosely approximates straight line motion.

FIG. 5 illustrates a top perspective view showing one preferred embodiment of the triangular arrangement of the linear actuators 161 (d1), 162 (d2), and 163 (d3). The inventive delta design is novel in that each end of each linear actuator is attached to a joint having at least one translational DOF. In contrast, existing designs include actuators which have one end of at least one actuator fixed with no translational DOF.

In order to move the end platform 180 to a desired position, control software, such as that used by controller 1604 in FIG. 16, calculates the required distances d1, d2, d3 between pairs of joints (A2-to-A3, A3-to-A1, A1-to-A2) and controllably commands the actuators to move via power source 1602. Each actuator length $d_i$ is defined opposite joint Ai for purposes of explanation.

The inventive arrangement shown in the preceding FIGS. has several advantages. The fixed base 110 may be smaller than for those apparatus' which require the increased structural integrity necessary for providing suitable attachment points for fixed actuator ends. The force applied by each linear actuator is applied equally to each of its two attached arms. Mechanical advantage may be improved from having two actuators to provide the force required at each arm. And mechanical advantage may be improved because each actuator has twice the travel length as compared to a one-end-fixed configuration.

Another advantage of the inventive delta arrangement is that the actuators may be disposed near the perimeter of the work volume, leaving the central area open and allowing the bellcrank-lower arm joint 170, i.e. point "E", and the links to the end platform 180 to move upward without obstruction. The inventive design enables the end effector platform 180 to be positioned on both sides of the plane defined by the planar base three rotatable attachment points. FIG. 6 illustrates these advantages. Bellcrank 120 is rotatably connected to base 110 and to one end of one linear actuator, e.g. 162, at end joint 150, and to one of the lower arms 140 at joint 170. As shown in the FIG. 6, each of the connections at 150 "A", 130 "B", and 170 "E" has at least one rotational degree of freedom. For example, this embodiment has "A" comprises three (3) DOF, "B" comprises one (1) DOF, and "E" comprises two (2) DOF. It can also be easily seen here that the arrangement enables the location of a center of mass of the apparatus not including the planar base which lies within a volume bounded by the planar base attachment points and on the side of the common midpoint. Thus, the weight of the apparatus tends to inherently preload the various joints by placing a bias weight toward the end platform 180, thereby eliminating backlash.

FIGS. 7a, 7b, and 7c illustrate three different bellcrank embodiments. As shown, each arm length "BE" can be varied relative to arm length "BA" to balance a required travel distance with the available linear actuator maximum force and travel distance. The angle "b" may be configured to change the direction of travel at point E, as shown by the arrows, respective to the direction of travel at driven point "A". The two alternatives of FIGS. 7a and 7b show different shapes, the third embodiment of FIG. 7c illustrates a structural arrangement.

FIG. 7a illustrates an arm optimized for vertical motion at lower arm joint 170'. This option provides end platform motion similar to a standard delta robot that uses vertically oriented linear rails. In this embodiment, the lower arm pairs (not shown) that are attached at joint 170' could be inverted such that the end platform 180 work area is located above the fixed base and actuators, i.e. higher on the z axis than joint 150'.

FIG. 7b illustrates a trapezoidal shape rigid bellcrank arm 120" optimized for horizontal motion. This embodiment is optimal with the end platform 180 work area above the fixed base 110 and arms 140, or fully inverted with the fixed base 110 at the top. In this context, "above" and "at the top" indicate higher on the z axis than joint 170". As in the previous embodiment, linear actuator 160 is rotatably disposed on joint 150" and arm 120" is rotatably attached at joint 130" to fixed base 110.

FIG. 7c illustrates a weight-saving tetrahedral space frame truss structural configuration for the bellcrank arm 120'''. For embodiments of the inventive hybrid delta robot that are very large, the simple triangular plate as exemplified in FIG. 7a becomes excessively heavy and expensive to build. A tetrahedral space frame truss assembly is thus a stiff and light weight alternative. Joints 150''', 170''' and 130''' are located in generally the same respective locations as for the FIG. 7a embodiment.

One optimized design of the hybrid delta robot includes a spherical joint on each bellcrank arm at joint 150 that allows 3 rotational degrees of freedom (DOF) movement between the arm and each of its connected linear actuators. This would allow the actuator to work in pure tension or compression and contribute to accurate motion, but may be somewhat more complex and difficult to manufacture. Several alternative designs for the bellcrank-to-actuator end joint 150 are thus presented below in FIGS. 8, 9, and 10. Each may be selected according to design tradeoffs between complexity, strength (stiffness/compliance/accuracy), and computational complexity of the control algorithms.

Each bell-crank-to-linear actuator joint 150 design shares approximately the same design configuration:

1. The orientation of the internal axes of the joint 150 remains approximately aligned with the local coordinate frame. The arm rotates only about $y_i$ and the actuators rotate primarily about $z_i$ with small deflections about $x_i$ and $y_i$.

2. The nominal angle between linear actuators is about 60 degrees (one vertex of an equilateral triangle).

3. The relative motion between arms produces approximately +/−12 degrees rotation per linear actuator about the $z_i$ axis.

4. The motion of a single arm produces approximately +/−30 degrees rotation at its "Ai" joint 150 about the $y_i$ axis.

5. The relative motion between arms produces approximately +/−3 degrees rotation at each "Ai" joint 150 about the $x_i$ axis.

FIG. 8 illustrates one such bellcrank-to-linear actuator joint design 151. Joint 151 may be described as a universal joint plus rotation for a bellcrank actuator end 121. Note that three points (e.g. A1, A2, and A3 shown in FIG. 5) define a plane. Three actuators with overlapping ends thus form a triangle (also a plane), and the three shafts will align themselves perpendicular to the plane and parallel to each other. The revolute joints for linear actuators 161, 162, 163 around respective common shaft in the z axis at the top of the FIG. 8 joint enable this characteristic.

The FIG. 8 joint design further incorporates a universal joint permitting each $z_i$ axis to independently orient itself with two additional rotational DOFs about the x and y axes respectively. The shafts for the linear actuators are attached to the upper half of the universal joint and provide the third rotational DOF around the z axis.

Because the triangular arrangement of the linear actuators holds the $z_i$ axes parallel, any common offset between actuators and the center of the universal joint cancels out and the control algorithms need no corrections.

FIGS. 9a, 9b, and 9c illustrate detailed views of another bellcrank-to-actuator end joint 150 "A". This design is a spherical joint for connecting bellcrank actuator end 121 to two of the linear actuators 162, 163. This joint design perfectly aligns the linear actuators with the desired control points at the cost of a large rotating housing as shown in FIG. 9b and complicated actuator ends.

FIG. 9b details a side view of the inner parts of the spherical joint. The outer ring rotates within a housing about the $y_i$ axis, the cross bar allows joint rotation about the $x_i$ axis, and the innermost shafts allow the actuators to rotate about the $z_i$ axis.

FIG. 9c details a top view of the spherical joint 150 showing the bends in the actuator end connectors that may be desired to maintain the linear actuators 162, 163 in alignment with the joint 150 axes. This design provides exact spherical joint behavior, so that no control software corrections are needed.

FIG. 10 illustrates another embodiment of a bellcrank-to-actuator end joint 150 "A." This embodiment that uses the simplest actuator ends for bellcrank 121, but requires the linear actuators 162, 163 to accommodate small axial twisting (approximately +/−5 degrees). Such twisting can be allowed through the inherent design of the actuators, or by use of appropriately flexible materials.

The FIG. 10 joint 150 in bellcrank 121 is configured in two halves. Each half lies on either side of the bellcrank center point location, and is offset by a small translation parallel to the $y_i$ axis. Each half independently provides two rotational DOF about the $y_i$ and $z_i$ axes. Rotation about $x_i$ is not provided by the joint 150, which forces each actuator 162, 163 to twist itself along its length during operation.

Other rotation sequences for reduced/eliminated twist to avoid gimbal lock fall within the scope of this embodiment. For example, the control software should correct for the translation offsets of this design actuator end joints. Since the offsets are parallel to $y_i$, they are invariant with respect to arm rotation and may be pre-computed once in the machine coordinate frame. The control software may also correct for axial twisting if the actuator's length changes due to the twisting, for example if a coarse pitch lead screw with the nut's orientation dependent upon one end is adopted.

The addition of springs, counterweights and/or cables may also be contemplated to improve the inventive design's performance. The illustrations imply a hydraulic or electrically driven cylinder type of actuator capable of supplying both compression and tension forces. Adding springs or counterweights that act to pull the bellcrank arms outwards would allow the use of cables, in tension only, which act as actuators.

Joints adopted in the designs thus far are universal-type or spherical-type joints having intersecting axes. In an embodiment of this invention, two non-intersecting axes of rotation, separated with a short "offset link", can reduce manufacturing cost at the expense of a small increase in run-time computational complexity and a small reduction in the extents of the work volume. The overall functionality is otherwise the same as in the previously described hybrid delta robot embodiments.

FIG. 11 illustrates such an alternative embodiment of the joint connections between the bellcrank 120, lower arm pair 140, 140' and the end effector platform 180. In this embodiment, bellcrank-lower arm joint 170 is configured as an offset two-axis joint with connecting pins allowing for rotation about the local y axis and the local z axis. Each offset link of this embodiment comprises an "L" shaped part 1210, 1220. The "L" shaped part may be of two pieces, each of which is attached to a respective one of the lower arm pair 140/140' as illustrated, or may be disposed as one part with appropriate design clearances. A lower arm-end effector platform joint 181 is substantially an opposite configuration to the joint 170. Thus, the lower arm pair 140, 140' enables the translation of platform 180 in the x, y, and z machine coordinate axes without rotation of the platform 180.

One goal in selecting the style of joints used in a hybrid delta robot is a minimized variation in length between any two points. For example, the effective length of link EH, see FIG. 5 for example, is the length of the rigid link plus or minus the slop or free play of the joints at each end. Any variation in length contributes to position error and backlash at the platform. The use of offset links as described in FIG. 11 may contribute to the position error, and thus appropriate compensation is desired.

Embodiments using offset links allow the use of simple rotational joints. Ball bearings may be used, ideally with enough axial load capability to allow preload which eliminates all play in the joint. Low cost hinge pins may be adopted, but these require close tolerances in the radial dimensions. Pins must be firmly attached on one side of the joint, but should also be easily removable as they are expected to wear over time.

FIG. 12 illustrates a detailed view of the alternative FIG. 11 offset link joint connections, here identified as lower arm assembly 1200. Lower arm joint 170 includes an offset piece 1210 which is intermediate between bellcrank 120 and lower arm pair 140/140'. End effector joint 181 includes of "L" shaped offset piece 1220 which is intermediate between lower arm pair 140/140' and end platform 180. Each side of the joints, e.g. at the ends of lower arm pair 140/140', has a set of internal threads into which threaded pins 1202, 1204, 1206 and 1208 may be threaded. The resulting joints at joint 170 and joint 181 thus rotate about the respective threaded pins in two orthogonal directions. Threaded pins 1202/1204/1206/1208 may also be of any common fastener or threaded rod to minimize cost. Note that a small gap, shown as "g" in FIG. 12, is required between parts mated in this way as the separation will vary as the parts rotate relative to each other. The threaded pin is prevented from rotating free (not shown) by tightening the fastener head against one side or adding a nut (not shown) to the thread rod. This arrangement also serves to eliminate free play by constraining the orientation of the rotational axis to be normal to the link.

If a single threaded joint is used, additional kinematics corrections may be desired to correct for the change in position along the axis of rotation as the two sides rotate. The effects may also be reduced by selecting a fine pitch thread. The link between pins 1204 and 1208 requires no corrections because the threads at either end have identical pitch. The parallel linkage ensures rotation at the same rate about pins 1204 and 1208 for each arm, which keeps the gaps the same, which means the lower arms 140/140' are always parallel to the line between the end joints at arm 120 and end platform 180. A similar relation holds for the set of joints B, E, and H as shown in FIG. 11. The base at B is horizontal, and the platform at H is constrained to be horizontal, so when all three joints B/E/H have a common thread pitch the rotation of the links induces is no net translation along the local Y axis between base and platform. Use of a threaded joint at B causes a translation of the outer arm along Y which is transferred to joint A; this can be corrected with a threaded joint for the Y axis at A. It may be noted that minor offsets exist due to the plane of the actuators varying a few degrees from horizontal.

Threaded joints can also be used on the set of three z axis joints at A. Each threaded pin connects two actuators with the rest of the A joint mechanism. Each actuator remains nominally parallel to the plane through the three A joints. The benefits of a threaded joint include a low initial cost, easy removal for service or replacement, supports both radial and axial loads, has a large bearing surface area, and with appropriate materials selection the pin can designed to be sacrificial both for wear and to break first under excess load.

Control Algorithms

FIG. 13 illustrates a coordinate system 1000 for describing an exemplary control theory of the hybrid delta robot. FIG. 13 defines the variable names used in solving the inverse kinematics for one arm of the robot. The "i" subscripts associating the variables to one of the three local coordinate frames are implied, but are not shown explicitly in the figure.

The geometry variables may be described in Table 1 below:

TABLE 1 a.

Geometry variables:

| | |
|---|---|
| B | Base position, defines the origin (0, 0, 0) of the local coordinate frame. |
| E | End effector of the actuator/arms part of the robot; e.g. where the lower arm pairs attach to the bellcrank joint 170. |
| H | Position of the joint between the lower arm pairs and the end platform 180. |
| G | Auxiliary point: projection of H into x-z plane (i.e. same as H but with y coordinate set to zero). Note that angle EGH is 90 degrees. |
| T | The common "Tool" point whose position is being controlled. |
| $\Phi_1$ | Angle of BE above x axis. |
| $\Phi_2$ | Angle of EG above the x axis. |
| $\Phi_3$ | Angle from EG to EH. Note $\Phi_3$ is measured in the plane defined by point E, G, and H; and is positive when the y coordinate of H is positive. |

Auxiliary variables:

| | |
|---|---|
| $c_k$ | $\cos(\Phi_k)$ |
| $s_k$ | $\sin(\Phi_k)$ |
| $X_s$ | One of the 4 × 4 transformation matrices from a local coordinate frame to the machine coordinate frame. Accounts for translation, rotation, and tilt of the local frame relative to the machine frame. Note it never rotates to follow arm motion. |
| $Inv(X_s)$ | One of the 4 × 4 transformation matrices from machine coordinate frame to the local coordinate frame, pre-calculated as the inverse of Xs. |

Inverse Kinematics—Position

The inverse kinematics for position take as input the desired position of the tool point in the machine coordinate frame (Tm), and outputs the required lengths d1, d2, d3 respectively of the three actuators 161, 162, 163. The approach is to independently solve each arm as a serial linkage, and then calculate the distances between pairs of Ai joints. Note that solving the serial linkages in this case is less complex than for standard delta, and so computer computations can be more efficient and use less computation time. Because angles are not driven directly by actuators, they can be defined for convenience of solving, rather than matching actuated joint angles, and inverse trigonometric functions need not be calculated.

The method for determining the positioning parameters for each arm "i" is outlined below. Note that the "m" subscripts in steps 1, 2, and 9 indicate coordinates in the machine coordinate frame, and that steps 3 through 8 use the local coordinate frame defined by the bellcrank arm. This coordinate transformation simplifies the 3D problem into 2D calculations. For a given input tool position Tm in the machine coordinate frame, the steps are repeated for each of the three bellcrank arms, each output Am being one of A1, A2, or A3 in the machine coordinate frame. The steps for positioning the tool on the end effector platform 180 comprise the following:

1. Transform Tm to Hm. Since the end platform does not rotate, this is a trivial translation of the coordinates.

2. Transform to the local coordinate frame: H=Inv(Xs)·Hm

3. Solve sides of triangle EGH:
G=H with y coordinate set to 0.
GH=absolute value of the y coordinate of H.
EH is known (length of lower arm pairs).
Find length EG using the Pythagorean theorem.

4. Solve for angle EBG:
Define e=length BG, b=length EG, g=length BE.
Define cb=cos(angle EBG) and sb=sin(angle EBG).
Solve for cb using the law of cosines: $b^2=g^2+e^2-2 \cdot g \cdot e \cdot cb$.
Solve for sb using the trigonometric identity: $sb^2+cb^2=1$.

5. Solve for rotation of triangle EBG:
Using length BG and the x and z coordinates of G,
solve for sin and cos of the angle of BG above the x axis.
Define sg=sin(angle×BG)/BG=G·z/e and cg=cos(angle×BG)/BG=G·x/e.

6. Solve for s1 and c1 using complex math:

$$(c1+j \cdot s1)=(cb+j \cdot sb) \cdot (cg+j \cdot sg)$$

7. Solve for E:

$$E_x=BE \cdot c1$$

$$E_y=0$$

$$E_z=BE \cdot s1$$

8. Solve for A:
The complex coefficient, K, is pre-computed when the arm is in its neutral position:

$$K=(A_x+j \cdot A_z)/(E_x+j \cdot E_z)$$

For any rotation of the arm, the positions of the two joints remain related through the equation:

$$(A_x+j \cdot A_z)=K \times (E_x+j \cdot E_z).$$

For this step, refer to any of the bellcrank arm diagrams.

9. Solve for $A_m$:

$$A_m=X_s \cdot A$$

If the robot is not built with exact spherical joints, corrections may need to be made to the Ai positions before calculating distances between them. For example, the joint design in the illustrated embodiment of FIG. 10 splits the spherical joint into two halves, each translated by an offset parallel to the $y_i$ axis. Since the arms rotate about the y axes, the translation vectors can be pre-multiplied by associated Xs transform matrix. The resulting vectors can be applied in the machine coordinate frame, which avoids needing a second expensive matrix multiplication to be performed for each split $A_m$.

FIG. 14 illustrates a coordinate system 1010 which is similar to the coordinate system 1000 but including diagrams for the transformation of offset links for use in describing an exemplary control theory of the hybrid delta robot. FIG. 14 defines the variable names used in solving the inverse kinematics for one arm of the robot as above, but with the additional names as follows. The "i" subscripts associating the variables to one of the three local coordinate frames are implied, but are not shown explicitly in the figure.

The additional geometry variables may be described in Table 2 below:

TABLE 2

Geometry variables:

E'  Offset end effector of the actuator/arms part of the robot; e.g. where the lower arm pairs attach to the bellcrank joint 170.
H'  Offset position of the joint between the lower arm pairs and the end platform.
G'  Offset of the auxiliary point: projection of H' into x-z plane (i.e. same as H' but with y coordinate set to zero). Note that angle E'G'H' is 90 degrees.

Inverse Kinematics—Position—Alternative Embodiment for Offset Links

The steps for positioning the tool on the end effector platform 180 with offset joints is similar to the steps outlined above with no offset joints. Step 3 above may be modified for offset joint calculations to comprise the following to solve sides of triangle E'G'H':

The length G'H'=absolute value of the y coordinate of H.
The length E'H' is known (length of lower arm pairs, excluding offset links).
Find length E'G' using Pythagorean theorem.
G'=H' with y coordinate set to 0.
Find length EG by adding offset link lengths to E'G'.

Inverse Kinematics—Velocity

Calculating the velocity of an actuator requires calculating the velocity of the Ai joint at each end, projecting those velocities onto the line between the two joints, and summing to get the net rate of change of the actuator length. The positions in the local coordinate frame of points B, E, G, and H need to have been calculated first. It may be noted that the joint designs shown in FIGS. 8 and 9 share a single point between adjacent actuator ends, so both ends obviously have the same motion vector.

A 3×3 Jacobian matrix may be created establishing the rate of change of the end platform's Cartesian coordinates over time (dx/dt, dy/dt, dz/dt) to the rate of change of the three angles ($d\Phi_1/dt$, $d\Phi_2/dt$, $d\Phi_3/dt$). For the desired end platform velocity, the equation is solved for $d\Phi_1/dt$ (the other two angular velocities are not needed). Note that the sines and cosines of the angles can be calculated directly from the current joint coordinates: it is not necessary to use inverse trig functions.

Using small angle approximations, the velocity at joint E is at a right angle to BE with magnitude length BE·$d\Phi_1/dt$. The velocity at joint A is at a right angle to BA with magnitude length BA·$d\Phi_1/dt$.

The FIG. 10 joint design needs no velocity corrections since the split halves have the same motion vector as the ideal spherical joint.

The calculations described above may be implemented into computer software instructions, the instructions to be executed in computer hardware, such as controller 1604, to control the hybrid delta robot operation. It is understood that the computer control may be in different forms as is common in the art, such as in ASICs, FPGAs, standard computer processors and memory, etc.

The above described calculations may be incorporated into a method 1300 for controlling an improved robotic arm system arranged in a modified delta configuration. The method is illustrated in FIG. 13. The method is initiated at start step 1302 which may include customizing the software code to cause the arm to operate in the desired manner. At step 1304, the delta-configured robotic arm apparatus is provided, such as that described in claims 1 and 2. The hardware is set up at the desired location, and the desired software code is initiated into the device.

An automatically calculating step 1306 establishes the needed linear actuator lengths for a desired position for the end effector platform or tool. This step takes an input from a desired position signal. See "C" in FIG. 16 as an input from an external source. The method may alternatively obtain the input from a pre-programmed sequence of positions that already resides in memory in controller 1604. Automatically calculating step 1306 further comprises the execution of computer software instructions to transform the desired position from the machine coordinate system to each local coordinate frame. The automatically calculating step further provides an output of the desired length of each of the linear actuators corresponding to the desired tool position. An example of how these calculations are obtained is provided previously.

If the tool path to be followed is important to the particular application, controller 1604 may optionally be enabled to calculate a sequential set of linear actuator lengths in order to establish a desired path. Path calculating step 1308 may be executed automatically by controller 1604 either during or prior to initiating the robot routines.

When a particular tool position is desired, controller 1604 begins an applying power step 1310 to the one or more of the arm apparatus linear actuators. The amount of power supplied and the rate of power applied from the controlled power supply 1602a/b/c may be based on the automatically calculating step 1306 and optionally step 1308. At this time, the tool begins to move toward the desired position as the linear actuators begin to change length.

In some embodiments, the accuracy of the robot mechanism and the precision required by the task is sufficient to allow delta robot operation without the need for feedback of the tool position to the controller 1604. In other embodiments, tool position feedback may be necessary in order to confirm proper tool location. Feedback may be supplied via input "FB" in FIG. 16. By means of the feedback signal, a step 1312 of establishing a desired length of the one or more linear actuators responsive to the applying power step may be provided. Alternatively, feedback position from the tool itself may be provided. This optional step 1312 may comprise controller 1604 obtaining an adjusted set of linear actuator lengths based on the feedback signal. Controller 1604 would then drive power supply 1602 to make the needed adjustments to establish the desired tool position.

Method 1300 may optionally comprise functions related to the desired velocity of the tool during operation. Thus a step 1318 of obtaining a desired end effector platform velocity may be performed substantially in parallel to calculating the tool desired position. The desired velocity, like the desired position, may be obtained from an external signal "C" to the controller 1604, or may be pre-programmed into controller memory.

Responsive to the desired tool or platform 180 velocity that is established at obtaining step 1318, the method at step 1320 automatically determines the desired rate of length change for each linear actuator. Controller 1604 then adjusts the applying power step 1310 to drive the linear actuators to the desired position at the desired rate.

The inventive method concludes with the step 1314 of arriving at the desired end effector platform 180 and/or its tool position when the linear actuator lengths are established responsive to the establishing step. At this step, the tool is in the desired position, and may further function as needed for picking, depositing, cutting, etc.

Modifications to the device, joint method, and displays as described above are encompassed within the scope of the invention. For example, various configurations of the positioning arm assembly which fulfill the objectives of the described invention fall within the scope of the claims. Also, the particular appearance and arrangement of the apparatus may differ.

Table of Elements - hash marks in Figures indicate alternate embodiments

| | |
|---|---|
| 10 | Prior art delta arm robot |
| 100 | Delta-configured robotic arm apparatus |
| 110 | Planar base |
| 120 | Bellcrank |
| 121 | First bellcrank |
| 122 | Second bellcrank |
| 123 | Third bellcrank |
| 130 | Base-to-bellcrank rotatable attachment point |
| 131 | First rotatable attachment point |
| 132 | Second rotatable attachment point |
| 133 | Third rotatable attachment point |
| 140 | Lower arm |
| 141 | First lower arm |
| 142 | Second lower arm |
| 143 | Third lower arm |
| 150 | Bellcrank-to-actuator end joint |
| 151 | A1 bellcrank-to-actuator end joint |
| 152 | A2 bellcrank-to-actuator end joint |
| 153 | A3 bellcrank-to-actuator end joint |
| 160 | Linear actuator |
| 161 | d1 First linear actuator |
| 162 | d2 Second linear actuator |
| 163 | d3 Third linear actuator |
| 170 | Bellcrank-lower arm joint |
| 171 | First bellcrank-lower arm joint |
| 172 | Second bellcrank-lower arm joint |
| 173 | Third bellcrank-lower arm joint |
| 180 | end effector platform |
| 181 | Lower arm-end effector platform joint |
| 182 | Second lower arm-end effector platform joint |
| 183 | Third lower arm-end effector platform joint |
| 1000 | Coordinate system for hybrid delta robot |
| 1010 | Alternate coordinate system for hybrid delta robot |
| 1200 | lower arm assembly |
| 1202 | Threaded pin |
| 1204 | Second threaded pin |
| 1206 | Third threaded pin |
| 1208 | Fourth threaded pin |
| 1210 | "L" shaped part, bell crank end offset link |
| 1220 | "L" shaped part, platform joint end offset link |
| 1300 | Method for controlling a delta arm robot |
| 1302 | start step |
| 1304 | Providing step |
| 1306 | Automatically calculating step |
| 1308 | Path calculating step |
| 1310 | Applying power step |
| 1312 | Establishing a desired length step |
| 1314 | Positioning end effector platform step |
| 1318 | Obtaining desired velocity step |
| 1320 | Automatically determining desired velocity for platform step |
| 1600 | Arrangement for controllers and power amplifiers for the actuator motors |
| 1602 | Controlled power source |
| 1602a | Controlled power supply, first linear actuator |
| 1602b | Controlled power supply, second linear actuator |
| 1602c | Controlled power supply, third linear actuator |

Table of Elements - hash marks in Figures indicate alternate embodiments

| | |
|---|---|
| 1604 | Hardware controller |
| 1606 | External power source |

What is claimed is:

1. An improved delta-configured robotic arm apparatus (100) comprising:
   a planar base (110) with three rotatable attachment points spaced at equal angular intervals around a common midpoint;
   three substantially identical movable arm assemblies, each movable arm assembly rotatably attached to one of the rotatable attachment points, comprising
      a rigid bellcrank (120) having a joint end rotatably attached to the respective rotatable attachment point, an actuator end and a lower arm end, and
      a lower arm pair (140) having a joint end rotatably attached to the bellcrank lower arm end and a rotatable platform attachment point end;
   an end effector platform (180) comprising three attachment points, each platform attachment point rotatably attached to a respective lower arm rotatable platform attachment point end; and
   three substantially identical linear actuators (161, 162, 163), each of the linear actuators having two ends, each end connected between two of the bellcrank actuator ends, such that the three linear actuators are disposed in a triangular arrangement.

2. The robotic arm apparatus of claim 1, further comprising:
   a power source (1602) configured to supply power independently to each of the three linear actuators; and
   a hardware controller (1604) that is programmed to controllably apply the power to each linear actuator for the purpose of positioning the end effector platform at a desired position with respect to the base.

3. The robotic arm apparatus of claim 2, further comprising a computer program product in communication with the hardware controller, the computer program product executing software instructions for converting an input of the desired end effector platform position to a length of each linear actuator,
   wherein the hardware controller applies power to each linear actuator to establish each length.

4. The robotic arm apparatus of claim 3, wherein the computer program product comprises a transform matrix function for the converting of the input of the desired end effector platform position to the length of each linear actuator.

5. The robotic arm apparatus of claim 3, wherein the computer program product further comprises software instructions for generating a path of the end effector platform from a first position to the desired position.

6. The robotic arm apparatus of claim 1, wherein each end of each linear actuator has at least one translational degree of freedom.

7. The robotic arm apparatus of claim 6, wherein at least one of the linear actuator ends comprises a universal joint.

8. The robotic arm apparatus of claim 6, wherein at least one of the linear actuator ends comprises a spherical joint.

9. The robotic arm apparatus of claim 6, wherein at least one of the linear actuator ends comprises an offset joint having a pair of revolute joints with each joint having an axis that is non-intersecting with the other joint axis, and further wherein the respective linear actuator comprises a shaft which is configured to either rotate or twist along a shaft longitudinal axis.

10. The robotic arm apparatus of claim 1, wherein the rigid bellcrank comprises one of a triangular shape, a trapezoidal shape, and a truss assembly.

11. The robotic arm apparatus of claim 1, wherein a center of mass of the apparatus not including the planar base lies within a volume bounded by the planar base attachment points and on the side of the common midpoint.

12. The robotic arm apparatus of claim 1, wherein the movable arm assemblies and the linear actuators are configured to enable the end effector platform to be positioned on both sides of a plane defined by the planar base three rotatable attachment points.

13. The robotic arm apparatus of claim 1, wherein the lower arm comprises an assembly of two substantially parallel lower arm members.

14. The robotic arm apparatus of claim 13, wherein the lower arm joint end comprises an offset joint, the lower arm joint end having at least two rotational degrees of freedom.

15. The robotic arm apparatus of claim 1, wherein the lower arm joint end comprises a rotary joint.

16. The robotic arm apparatus of claim 15, wherein the lower arm joint end rotary joint comprises at least two rotational degrees of freedom.

17. A method for controlling an improved robotic arm system arranged in a modified delta configuration, comprising the steps of:

providing (1304) a delta-configured robotic arm apparatus as described in claim 2;
automatically calculating (1306) a desired position for the end effector platform;
applying power (1310) to one or more of the arm apparatus linear actuators based on the automatically calculating step;
establishing a desired length (1312) of the one or more linear actuators responsive to the applying power step; and
positioning (1314) the end effector platform in the desired position responsive to the establishing step.

18. The method of claim 17, wherein the automatically calculating step comprises executing computer software instructions to transform the desired position in a machine coordinate system to an arm coordinate system.

19. The method of claim 18, wherein the automatically calculating step further provides an output of the desired length of each of the linear actuators corresponding to the desired position in the arm coordinate system.

20. The method of claim 17, further comprising the steps of:

obtaining a desired end effector platform velocity (1318);
automatically determining a linear actuator rate of change (1320) for each of the linear actuators according to the obtaining step; and
powering the linear actuators based on the automatically determining step to establish a desired velocity of the one or more linear actuators.

* * * * *